US010708885B2

(12) United States Patent
Di Girolamo et al.

(10) Patent No.: US 10,708,885 B2
(45) Date of Patent: Jul. 7, 2020

(54) METHODS AND NODES FOR ENABLING CONTEXT-AWARENESS IN COAP

(71) Applicant: CONVIDA WIRELESS, LLC, Wilmington, DE (US)

(72) Inventors: Rocco Di Girolamo, Laval (CA); Quang Ly, North Wales, PA (US); Xu Li, Plainsboro, NJ (US); Chonggang Wang, IV, Princeton, NJ (US); Shamim Akbar Rahman, Cote St. Luc (CA); Zhuo Chen, Claymont, DE (US); Vinod Kumar Choyi, Conshohocken, PA (US); Lijun Dong, San Diego, CA (US)

(73) Assignee: Convida Wireless, LLC, Wilmington, DE (US)

( * ) Notice: Subject to any disclaimer, the term of this patent is extended or adjusted under 35 U.S.C. 154(b) by 137 days.

(21) Appl. No.: 16/062,404

(22) PCT Filed: Dec. 15, 2016

(86) PCT No.: PCT/US2016/066837
§ 371 (c)(1),
(2) Date: Jun. 14, 2018

(87) PCT Pub. No.: WO2017/106450
PCT Pub. Date: Jun. 22, 2017

(65) Prior Publication Data
US 2019/0007928 A1     Jan. 3, 2019

Related U.S. Application Data

(60) Provisional application No. 62/267,444, filed on Dec. 15, 2015.

(51) Int. Cl.
*H04L 29/08* (2006.01)
*H04W 72/00* (2009.01)
(Continued)

(52) U.S. Cl.
CPC ......... *H04W 72/005* (2013.01); *H04L 5/0055* (2013.01); *H04L 67/12* (2013.01);
(Continued)

(58) Field of Classification Search
CPC ............ H04L 67/12; H04L 5/00; H04W 4/08; H04W 4/70; H04W 88/182; H04W 2/08; H04W 72/00
See application file for complete search history.

(56) References Cited

U.S. PATENT DOCUMENTS

2013/0201839 A1   8/2013   Ree et al.
2014/0369251 A1   12/2014  Zhang

FOREIGN PATENT DOCUMENTS

WO   2016100631 A1   6/2016

OTHER PUBLICATIONS

Musumba et al., "Context Awareness in Mobile Computing: A Review", Int J. Machine Learn Appl. 2013; 2(1), Art. #5, 10 pages.
(Continued)

Primary Examiner — Kent Krueger
(74) Attorney, Agent, or Firm — BakerHostetler

(57) ABSTRACT

CoAP network nodes may leverage context awareness to take autonomous action to adjust network operations. Context-aware procedures may be pre-configured, established by management entities, or negotiated between nodes, and include parameters for the monitoring and evaluation of data, as well has triggers for taking action. By monitoring requests to observe a resource, a node may determine when a resource should transition to multicast or unicast notification, and dynamically manage multicast group membership based on observation registrations and/or cancellations. By monitoring resource requests, a proxy may determine when to proactively refresh a cached representation of a resource. By monitoring timeouts and/or retransmissions, a client may
(Continued)

dynamically adjust a timeout value to optimize communications.

20 Claims, 22 Drawing Sheets

(51) Int. Cl.
    *H04W 4/70*     (2018.01)
    *H04L 5/00*     (2006.01)
    *H04W 4/08*     (2009.01)
    *H04W 24/08*     (2009.01)
    *H04W 88/18*     (2009.01)

(52) U.S. Cl.
    CPC ............... *H04W 4/08* (2013.01); *H04W 4/70* (2018.02); *H04W 24/08* (2013.01); *H04W 88/182* (2013.01)

(56) References Cited

OTHER PUBLICATIONS

Shelby et al., "The Constrained Application Protocol (CoAP)", Internet Engineering Task Force (IETF), Request for Comments: 7252, Jun. 2014, 113 pages.

Hartke et al., Observing Resources in CoAP draft-ietf-core-observe-16, CoRE Working Group, Internet-Draft, Dec. 30, 2014 34 pages.

Rahman et al., "Group Communication for the Constrained Application Protocol (CoAP)", Internet Engineering Task Force (IETF) RFC: 7390, Oct. 2014, 47 pages.

Li et al., "Conditional Observe in CoAP draft-li-core-conditional-observe-05", core Internet-Draft, Apr. 18, 2015, 14 pages.

Bormann et al., "Block-Wise Transfers in CoAP draft-ietf-core-block-17", CoRE Working Group, Internet-Draft, Mar. 9, 2015, 33 pages.

Shelby et al., "CoRE Resource Directory draft-ietf-core-resource-directory-02", CoRE Internet-Draft, Nov. 9, 2014, 37 pages.

FIG. 6

```
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |Ver| T |  TKL  |      Code     |          Message ID           |
 +-+-+-+-+-+-+-+-+-+-+-+-+-+-+-+-+-+-+-+-+-+-+-+-+-+-+-+-+-+-+-+-+
 |   Token (if any, TKL bytes) ...
 +-+-+-+-+-+-+-+-+-+-+-+-+-+-+-+-+-+-+-+-+-+-+-+-+-+-+-+-+-+-+-+-+
 |   Options(if any) ...
 +-+-+-+-+-+-+-+-+-+-+-+-+-+-+-+-+-+-+-+-+-+-+-+-+-+-+-+-+-+-+-+-+
 |1 1 1 1 1 1 1 1|    Payload (in any) ....
 +-+-+-+-+-+-+-+-+-+-+-+-+-+-+-+-+-+-+-+-+-+-+-+-+-+-+-+-+-+-+-+-+
```

METHODS AND NODES FOR ENABLING CONTEXT-AWARENESS IN COAP

CROSS-REFERENCE TO RELATED APPLICATIONS

This Application is a National Stage Application filed under 35 U.S.C. § 371 of International Application No. PCT/US2016/066837 filed Dec. 15, 2016, which claims the benefit of U.S. Provisional Application No. 62/267,444, filed on Dec. 15, 2015, entitled "Methods and Nodes for enabling context-awareness in CoAP", the contents of which are hereby incorporated by reference in their entirety.

BACKGROUND

Machine-To-Machine (M2M), Internet-of-Things (IoT), and Web-of-Things (WoT) network deployments may employ unicast and multicast communications between nodes such as M2M/IoT/WoT servers, gateways, and devices which host M2M/IoT/WoT applications and services. Such network deployments may include, for example, constrained networks, wireless sensor networks, wireless mesh networks, mobile ad-hoc networks, and wireless sensor and actuator networks. These may use various protocols, such as Internet Engineering Task Force (IETF) RFC 7252 Constrained Application Protocol (CoAP) and IETF RFC 7390 Group Communication for the Constrained Application Protocol. CoAP is a web transfer protocol useful in constrained environments, e.g., environments with low-power devices and/or lossy communications. CoAP networks may include such devices as constrained devices, user mobile devices, sensor nodes, actuator nodes, medical devices, gateways, and network applications servers.

A CoAP endpoint is a logical and/or physical node in a CoAP network. Each CoAP endpoint may perform many roles. A CoAP sender is the originating endpoint of a message. A CoAP recipient is the destination endpoint of a message. A CoAP client is the originating endpoint of a request and the destination endpoint of a response. A CoAP server is the destination endpoint of a request and the originating endpoint of a response.

A CoAP resource is an object which has a type, associated data, and possibly relationships to other resources. CoAP uses a client/server model similar to Hypertext Transfer Protocol (HTTP). Resources are identified by a Uniform Resource Identifier (URI) and are operated on by a set of methods (GET, POST, PUT, and DELETE). A client requests an action by sending a message specifying the resource URI and the method. The server issues a response. The response potentially contains a representation of the resource.

A "group notification" is a notification sent from a server to a group of clients. An "eligible resource" is a resource on a server that allows group notifications, whereby copies of the resource are provided to the group of clients via multicast messages sent by the server. An "observe" is a procedure whereby a CoAP client may receive multiple notifications as the state of a resource changes by requesting that a server register the client in a list of observers of the resource.

A CoAP management entity is a logical entity that may configure and/or manage functionality of CoAP nodes and their interaction. A CoAP proxy is an endpoint that acts both as a server towards a client, and as a client towards an origin server. A CoAP proxy forwards requests and relays back responses, possibly performing caching, namespace translation, or protocol translation in the process.

SUMMARY

Disclosed herein are methods and devices whereby CoAP network nodes may leverage context awareness to take autonomous action to adjust network operations. Context-aware procedures may be pre-configured, established by management entities, or negotiated between nodes, and include parameters for the monitoring and evaluation of data, as well as triggers for taking action.

By monitoring requests to observe a resource, a node may determine when a resource should transition to multicast or unicast notification, and dynamically manage multicast group membership based on observation registrations and/or cancellations. By monitoring resource requests, a proxy may determine when to proactively refresh a cached representation of a resource. By monitoring timeouts and/or retransmissions, a client may dynamically adjust a timeout value to optimize communications.

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention. However, the invention is not limited to the specific methods, compositions, and devices disclosed.

FIG. 6 shows the CoAP message format.

DETAILED DESCRIPTION OF ILLUSTRATIVE EMBODIMENTS

Figure 1:
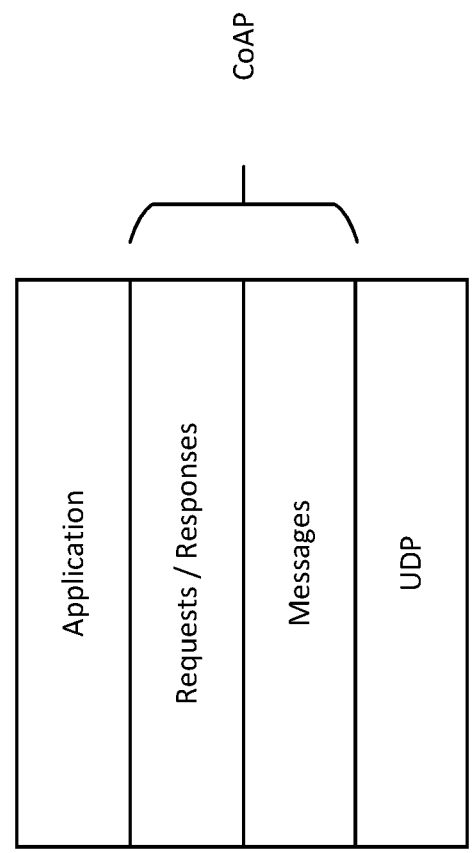
FIG. 1 depicts abstract layers of the CoAP protocol.

Disclosed herein are methods and devices whereby network CoAP nodes may leverage context awareness to take autonomous action to adjust network operations. Context-aware procedures may be pre-configured, established by management entities, or negotiated between nodes, and include parameters for the monitoring and evaluation of data, as well as triggers for taking action.

By monitoring requests to observe a resource, a node may determine when a resource should transition to multicast or unicast notification, and dynamically manage multicast group membership based on observation registrations and/or cancellations. For example, through a CoAP Observe-GroupNotification option, a client may inform a server whether it is willing to accept multicast notifications of changes in the status of a resource the client wishes to observe.

Similarly, by monitoring resource requests, a proxy may determine when to proactively refresh a cached representation of a resource. Proxy cache images may be refreshed, for example, via observe methods or validation methods.

Further, by monitoring timeouts and/or retransmissions, a client may dynamically adjust a timeout value to optimize communications. For example, the adjustment may be made through a count of the number of acknowledgements to a confirmable message. Alternatively, the adjustment may also be made through an estimate of the round trip time facilitated through a Tx-Count option mechanism, whereby a Tx-Count option in a confirmable message informs a server whether the message is a 1st, 2nd, 3rd, etc. transmission. This Tx-Count is echoed in the acknowledgement to the message.

As defined by the IETF, the standard CoAP protocol includes very limited context awareness. Specifically, certain methods may be conditioned on the presence or absence of a resource at an endpoint. The inventors observe that a rich amount of context information is available to the CoAP layer. Such information may be exploited to alleviate network load and associated consumption of constrained resources. Through extensions of the CoAP protocol described herein, power and network bandwidth may be conserved, and endpoint processing reduced, by context-aware methods which result in the overall reduction of network traffic.

Useful context information may take many forms. It includes, but is not limited to, user location, time of day, neighboring users and devices, user activities, level of activity. It includes the computing environment, such as available processors, devices accessible for user input and output, network capacity, connectivity, and cost of computing. It also includes the application environment, such as location, which nodes are nearby, and social context. It includes the physical environment, such as temperature, lighting, air pressure, humidity, and noise levels, for example.

Context information may be acquired in a number of ways. For example, information may be acquired automatically via optical, chemical, electronic, or mechanical sensors, as well as by user input or the observation of network traffic.

Context-awareness may be used to determine actions taken by applications running on various network nodes such as user devices, as well as actions taken by various layers of the communication protocol stack used by any or all of the nodes of a network. This includes, for example, the application layers of various protocols, including CoAP.

Context-aware determinations may be made autonomously at a single node, or may involve interactions between nodes. For example, a smartphone may autonomously adjust the orientation of a video playback upon sensing a change in the phone's physical position. No interaction with another device is required to take this action. With orientation awareness, the smartphone is able to determine for itself whether portrait or landscape presentation is better for the user experience. In contrast, when an automobile passenger uses his or her smartphone to discover nearby Chinese restaurants via Google maps, multiple nodes may be involved in acquiring and using context information. The smartphone may, for example, provide internal GPS data to Google, which Google then applies in determining what data to send in response. Similarly, the smartphone may use a dialogue with a cell phone tower or a WiFi hotspot to better determine its position.

CoAP sits between the application and the transport protocol. As shown in FIG. 1, CoAP may be considered to include two layers of operation. One CoAP layer deals with User Datagram Protocol (UDP) asynchronous messaging. The second CoAP layer deals with request and response interactions that are carried in CoAP methods such as GET, PUT, POST, and DELETE, as well the associated response codes.

Figure 2:
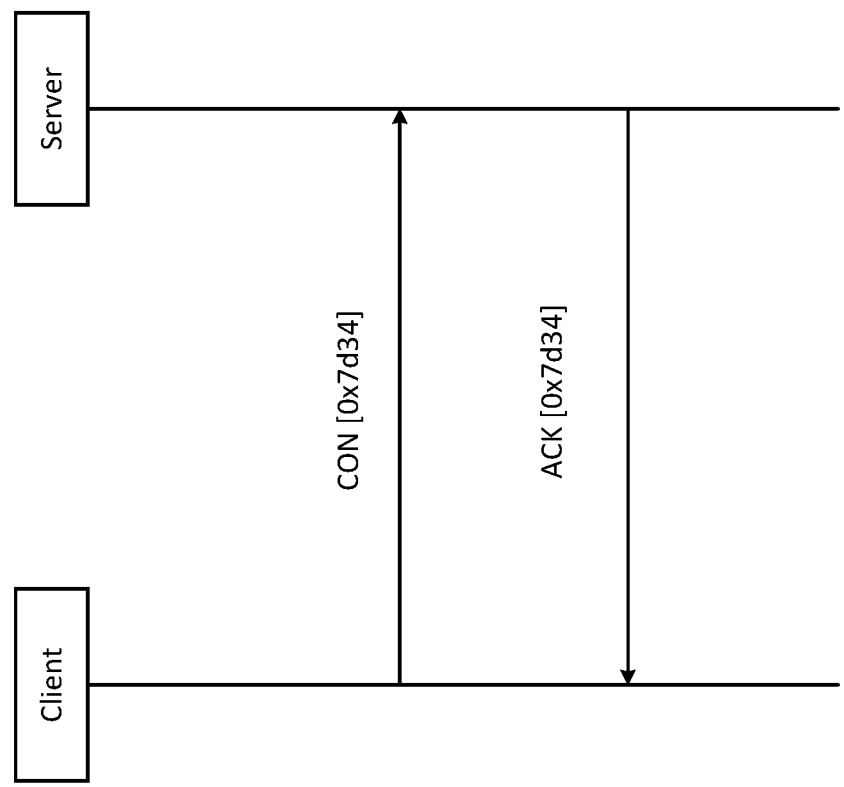
FIG. 2 is a call flow diagram showing an example of CoAP CON and ACK messages.

The IETF defines four types of CoAP messages. A confirmable (CON) message is retransmitted using a default timeout and exponential back-off between retransmissions. An acknowledgement (ACK) message is used to acknowledge a CON message. FIG. 2 shows an example of the confirmable message with ACK of the same message ID 0x7d34. CON messages may be retransmitted, for example, until the sender receives an acknowledgement (ACK) message from the recipient which contains a message ID that matched the original message.

Figure 3:
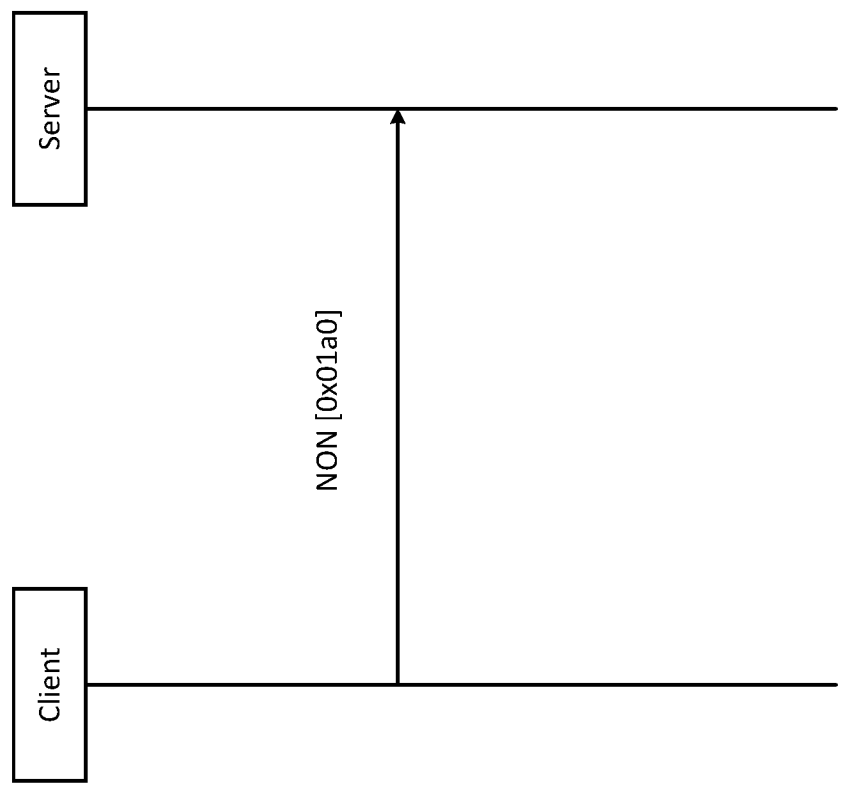
FIG. 3 is a call flow diagram showing an example of a CoAP NON message.

A non-confirmable (NON) message does not require reliable transmission. For example, each individual measurement in a stream of sensor data may be sent as a NON message. These messages are not acknowledged, but still contain a message ID for duplicate detection. An example with message ID 0x01a0 is shown in FIG. 3. A reset (RST) message may be used when a recipient is not able to process a NON message.

CoAP, which relies on the UDP transport protocol, provides its own mechanism to ensure reliable message transmission. Each message includes a message ID. CON messages are retransmitted using a default timeout and exponential back-off between retransmissions, until the sender receives an ACK from the recipient with a matching message ID. Retransmission is controlled by a timeout and a retransmission counter. For each new Confirmable message, the sender chooses an initial timeout, e.g., based on the ACK_TIMEOUT transmission parameter. The sender also sets a retransmission counter to 0. If the timeout is triggered and the retransmission counter is less than some maximum, e.g., MAX_RETRANSMIT transmission parameter, then the sender: retransmits the Confirmable message with the same message ID; increments the retransmission counter; and doubles the timeout value.

Figure 4:
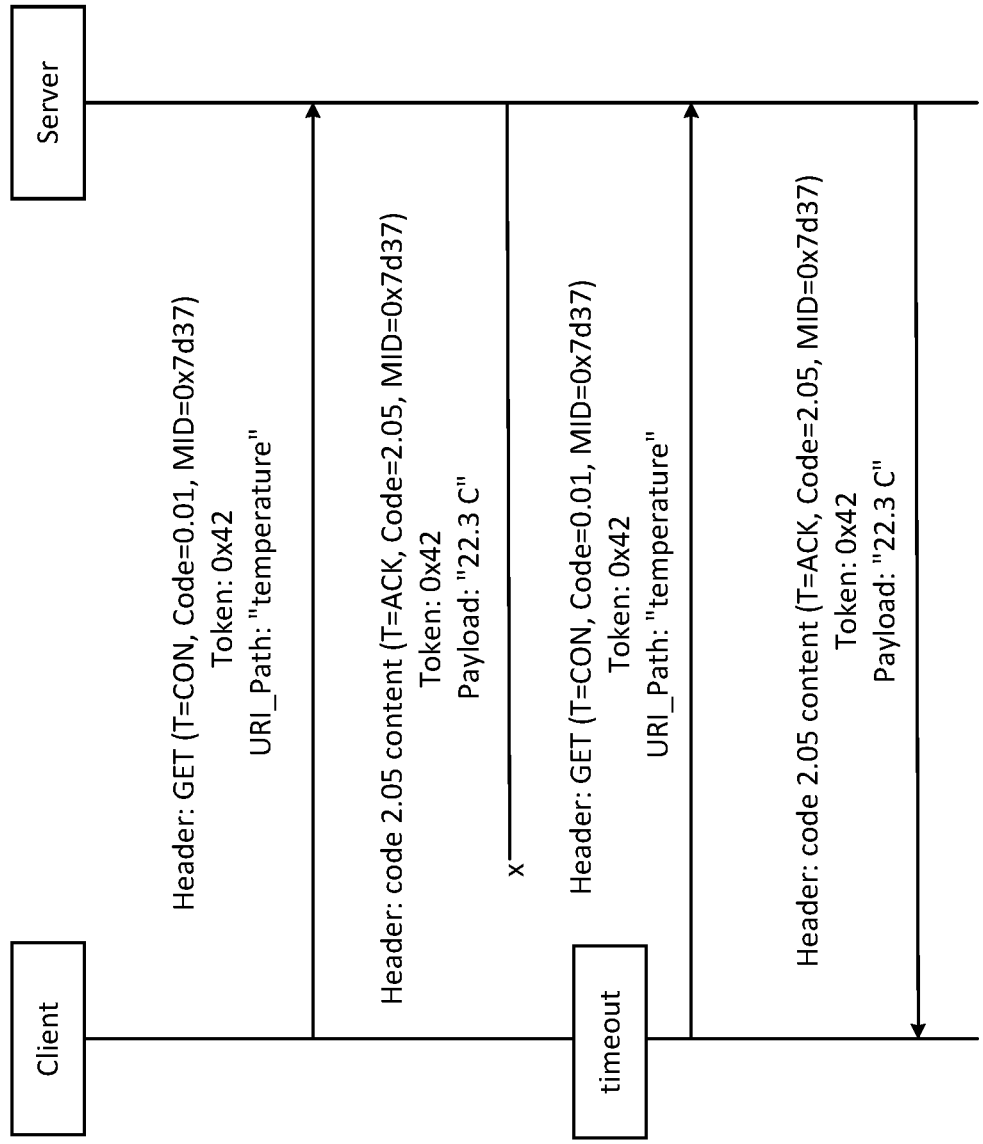
FIG. 4 is a call flow diagram showing an example of CoAP reliable message delivery.

If the retransmission counter equals MAX_RETRANSMIT, the message transmission is cancelled and the application may be notified. The default values for ACK_TIMEOUT and MAX_RETRANSMIT are 2 seconds and 4, respectively. An example is shown in FIG. 4, where the ACK for message (Message ID=0x7d37) is lost and the client times out and is forced to retransmit.

The list of relevant parameters used to control message transmission and limit congestion are shown in Table 1. Also included are the default values for these parameters.

TABLE 1

Message Transmission Parameters

| Name | Description | Default Value |
| --- | --- | --- |
| ACK_TIMEOUT | Base retransmission timeout value | 2 seconds |
| ACK_RANDOM_FACTOR | Retransmission timeout multiply factor. Initial retransmission timeout = random between ACK_TIMEOUT and (ACK_TIMEOUT * ACK_RANDOM_FACTOR) | 1.5 |
| MAX_RETRANSMIT | Maximum number of retransmissions for a confirmable message | 4 |
| NSTART | Number of simultaneous outstanding interactions that a client maintains to a given server | 1 |

Note that the specification for standard CoAP allows dynamically changing these values to better match the intended application. However it does not describe any method for accomplishing this.

CoAP request and response semantics are carried in CoAP messages, which include either a method code or response code, respectively. Optional or default request and response information, such as the URI and payload media type, are carried as CoAP options. A token is used to match responses to requests independently from the underlying messages.

Figure 5:
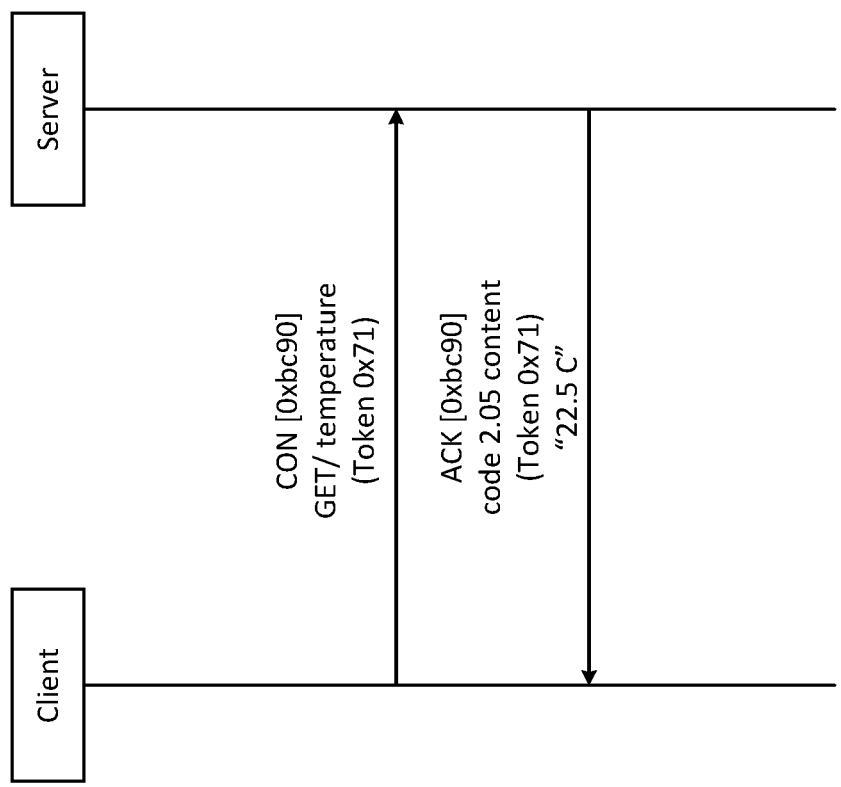
FIG. 5 is a call flow diagram showing an example of CoAP requests and responses.

A request is carried in a confirmable (CON) or a non-confirmable (NON) message. If immediately available, the response to a request is carried in the resulting acknowledgement (ACK) message, as shown in FIG. 5. This is called a piggy-backed response. If a request is sent in a non-confirmable message, then the response is sent using a new non-confirmable message.

CoAP messages are encoded in a simple binary format, as shown in FIG. 6. The message format starts with a fixed-size 4-byte header. This is followed by a variable-length token value which can be between 0 and 8 bytes long. Following the token value comes a sequence of zero or more CoAP options in type-length-value (TLV) format, optionally followed by a payload which takes up the rest of the datagram.

The fields in the header are as follows. Version (Ver) is a 2-bit unsigned integer indicating the CoAP version number. Type (T) is 2-bit unsigned integer indicating whether the message is Confirmable (0), Non-confirmable (1), an Acknowledgement (2), or a Reset (3). Token Length (TKL) is a 4-bit unsigned integer indicating the length of the variable-length Token field, where the length of the Token field is 0-8 bytes. Token lengths of 9-15 bytes are reserved. A token length field indicating a length of 9-15 bytes must not be sent. If such a token length field is received, it must be processed as a message format error.

Code is an 8-bit unsigned integer, split into a 3-bit class (the most significant bits) and a 5-bit detail (the least significant bits), documented as c.dd where c is a digit from 0 to 7 for the 3-bit subfield and dd are two digits from 00 to 31 for the 5-bit subfield. The class can indicate a request (0), a success response (2), a client error response (4), or a server error response (5). All other class values are reserved. As a special case, Code 0.00 indicates an empty message. In the case of a request, the code field indicates the request method. In the case of a response, the code field indicates a response code.

CoAP code values are included in the CoAP code registry, as shown in Table 2.

TABLE 2

CoAP Code Values

| Code Value | Description |
| --- | --- |
| 0.00 | Indicates an Empty message |
| 0.01 | Indicates a GET request |
| 0.02 | Indicates a POST request |
| 0.03 | Indicates a PUT request |
| 0.04 | Indicates a DELETE request |
| 0.04-0.31 | Unassigned Method request codes |
| 1.00-1.31 | Reserved |
| 2.00 | Unassigned response code |
| 2.01 | Response Code - Created |
| 2.02 | Response Code - Deleted |
| 2.03 | Response Code - Valid |
| 2.04 | Response Code - Changed |
| 2.05 | Response Code - Content |
| 2.06-2.31 | Unassigned response code |
| 3.00-3.31 | Response Code - reserved for future use |
| 4.00 | Response Code - Bad Request |
| 4.01 | Response Code - Unauthorized |
| 4.02 | Response Code - Bad Option |
| 4.03 | Response Code - Forbidden |
| 4.04 | Response Code - Not Found |

TABLE 2-continued

CoAP Code Values

| Code Value | Description |
|---|---|
| 4.05 | Response Code - Method Not Allowed |
| 4.06 | Response Code - Not Acceptable |
| 4.07-4.11 | Unassigned response code |
| 4.12 | Response Code - Precondition Failed |
| 4.13 | Response Code - Request Entity Too Large |
| 4.14 | Unassigned response code |
| 4.15 | Response Code - Unsupported Content-Format |
| 4.16-4.31 | Unassigned response code |
| 5.00 | Response Code - Internal Server Error |
| 5.01 | Response Code - Not Implemented |
| 5.02 | Response Code - Bad Gateway |
| 5.03 | Response Code - Service Unavailable |
| 5.04 | Response Code - Gateway Timeout |
| 5.05 | Proxying Not Supported |
| 5.06-5.31 | Unassigned response code |
| 6.00-7.31 | Reserved |

Message ID is a 16-bit unsigned integer in network byte order. A message ID is used for the detection of message duplication, and to match messages of type Acknowledgement/Reset to messages of type Confirmable/Non-confirmable.

The fields after the header are the token field and the options. The token is 0 to 8 bytes, as given by the token length field. The token value is used to correlate requests and responses. An option can be followed by the end of the message, by another option, or by the payload marker (1111 1111) and the payload.

CoAP defines a number of options which can be included in a message. Both requests and responses may include a list of one or more options. For example, the URI in a request is transported in several options, and metadata that would be carried in an HTTP protocol header is supplied as options as well. Each option instance in a message specifies the option number of the defined CoAP option, the length of the option value and the option value itself. The option value can be empty, opaque, Uint (a non-negative integer), or a string.

Both requests and responses may include a list of one or more options. CoAP defines a single set of options that are used in both requests and responses. Options fall into one of two classes: "critical" or "elective". An Option is identified by an option number, which also provides some additional semantics information. For example, odd option numbers indicate a critical option, while even option numbers indicate an elective option. The difference between these is how an unrecognized option is handled by an endpoint. Upon reception, unrecognized options of class "elective" must be silently ignored. Unrecognized options of class "critical" that occur in a confirmable request must cause the return of a 4.02 (Bad Option) response. Unrecognized options of class "critical" that occur in a Confirmable response, or piggybacked in an Acknowledgement, must cause the response to be rejected. Unrecognized options of class "critical" that occur in a non-confirmable message must cause the message to be rejected.

Options are also classified based on how a proxy is to deal with the option if it does not recognize it. For this purpose, an option can either be considered unsafe-to-forward (UnSafe is set) or safe-to-forward (UnSafe is clear). In addition, for an option that is marked Safe-to-Forward, the option number indicates whether it is intended to be part of the cache-key in a request or not. If some of the NoCacheKey bits are 0, it is part of the cache-key. If all NoCacheKey bits are 1, it is not.

An option that is repeatable may be included one or more times in a message. Table 3 shows two examples of the properties of CoAP options Proxy-scheme and Size1.

TABLE 3

Properties of Options

| No. Number | C Critical | U Unsafe | N NoCacheKey | R Repeatable | Name | Format | Length | Default |
|---|---|---|---|---|---|---|---|---|
| 39 | x | x | — | | Proxy-scheme | String | 1-255 | (none) |
| 60 | | | x | | Size1 | Uint | 0-4 | (none) |

The CoAP Options are maintained by an Internet Assigned Numbers Authority (IANA) registry. The IANA policy for future additions to this sub-registry is split into three tiers as follows. The range of 0 . . . 255 is reserved for options defined by the IETF. The range of 256 . . . 2047 is reserved for commonly used options with public specifications (Specification Required). The range of 2048 . . . 64999 is for all other options including private or vendor specific ones.

CoAP defines four methods, GET, POST, PUT and DELETE. The GET method retrieves a representation for the information that currently corresponds to a resource identified by the request URI. Upon success a 2.05 (Content) or 2.03 (Valid) response code should be present in the response. The POST method requests that the representation enclosed in the request be processed. The actual function performed by the POST method is determined by the origin server and dependent on the target resource. It usually results in a new resource being created or the target resource being updated.

The PUT method requests that the resource identified by the request URI be updated or created with the enclosed representation. If a resource exists at the request URI, the enclosed representation should be considered a modified version of that resource, and a 2.04 (Changed) response code should be returned. If no resource exists then the server may create a new resource with that URI, resulting in a 2.01 (Created) response code. The DELETE method requests that the resource identified by the request URI be deleted. The CoAP base protocol indicates that methods beyond the basic four can be added to CoAP in separate specifications. New methods do not necessarily have to use requests and responses in pairs.

The request-response basis of the CoAP core protocol does not work well when a client is interested in having the resource representation over a period of time. The IETF CoRE Working Group draft standard regarding observing resources in CoAP, draft-ietf-core-observe-16, suggests extending the CoAP core protocol with a mechanism for a CoAP client to "observe" a resource on a CoAP server. CoAP observe is a subscribe-notification mechanism where one request results in multiple responses. The client registers its interest in a resource by issuing an extended GET request to the server. This request causes the server to add the client to the list of observers of the resource.

Figure 7:
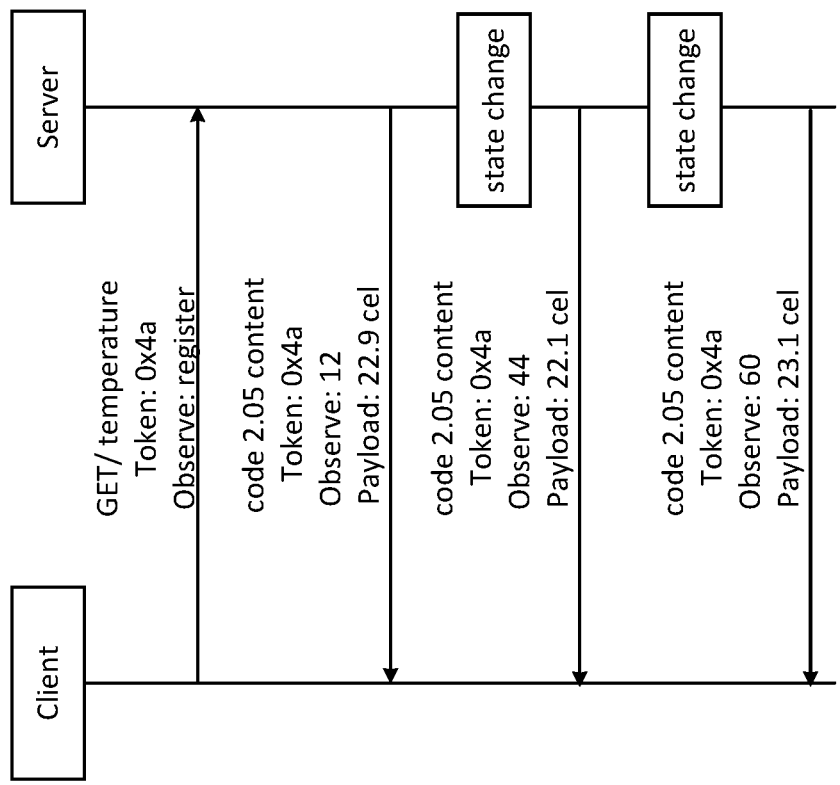
FIG. 7 is a call flow diagram of an example of a CoAP observation registration and resource notifications.

FIG. 7 shows an example of a CoAP client registering its interest in a resource called "/temperature". The server sends a response with the current state of the resource upon registration. Subsequently, upon every state change of the resource, the CoAP server sends a notification, i.e., an additional CoAP response to the CoAP client with the new representation.

The client correlates the notifications in response to the original request through the token carried in the response message header. A client remains on the list of observers until it either: deregisters (cancels its observe registration); rejects a notification from the server; or fails to respond to a confirmable notification message.

In draft-li-core-conditional-observe-05, the IETF CoRE Working Group has addressed the notion of a conditional observe, whereby the server sends notifications only if a condition passes. In this scheme, the condition supplied by the client may be based on the value/content of the resource, e.g., resource value>x, resource value<x, resource value=x, x1<resource value<x2, change in resource value exceeds x, etc. Similarly the condition may be based on a time interval between notifications, e.g., greater than a minimum, or less than a maximum.

CoAP group communications allow a source node to send a single application-layer CoAP message to be delivered to multiple destination nodes, where all destinations are identified as belonging to a specific group. The source node itself may be part of the group.

The underlying mechanism for CoAP group communication is UDP/IP multicast, where an IP multicast address is associated with the group. IP multicast is a method for sending IP datagrams to a group of interested receivers in a single transmission.

Members of the group are informed about their IP multicast address through configuration. This configuration can be achieved by several mechanisms, such as the three following examples. First, an endpoint may be pre-configured, whereby the endpoint is set up with membership before deployment. The preconfigured group information for a CoAP server may be, for example, either an IP multicast address or a hostname.

Second, an endpoint may discover its group membership through a resource directory (RD) or through service discovery. For example, a CoAP server may look up its group membership using techniques such as CoAP RD, as discussed in IETF CoRE Resource Directory, draft-ietf-core-resource-directory-02.

Third, an endpoint may be configured via another node, such as a commissioning device or a management entity. For example, a dynamic commissioning tool may determine which group or groups a sensor or actuator node belongs to, and then write this information to the node. The node may subsequently join the correct IP multicast groups on its network interface. This may be accomplished, for example, using a Membership Configuration RESTful interface for configuring endpoints with group information. This interface allows the commissioning node to use GET/PUT/POST/DELETE methods to manage group memberships. In particular, the interface allows the commissioning device to do the following:
   create a new multicast group membership (POST);
   delete a single group membership (DELETE);
   read group membership (GET);
   update a group membership (PUT); and
   perform proxy/caching services.

CoAP endpoints may support caching of resource representations to facilitate subsequent requests for the same resource. A server may specify how long a resource may be cached by specifying the Max-Age option in its response. The Max-Age may be set to 0 to indicate that a resource representation should not be cached. When an endpoint receives a request, it first checks whether it can use the cached response. The endpoint uses a "freshness" mechanism to determine whether the representation is still valid, whereby the endpoint checks whether the representation is older than Max-Age.

If the representation is no longer fresh, the endpoint may use a "validation" mechanism to see if one of its stored representations is valid, whereby the endpoint contacts the origin server and provides an entity-tag (ETag) list to the server. An ETag is associated with each resource representation that the endpoint has received in prior exchanges with the origin server. The ETag is assigned by the origin server and provided in the resource response along with the Max-Age. Upon reception of this ETag list, the origin server may check whether the representations on the list are still valid. If so, the endpoint may renew the cache freshness. Otherwise, the origin server may supply a new representation to the cache-hosting endpoint.

In addition, CoAP allows both forward and reverse proxies. Proxies are endpoints that are used to request a resource on behalf of a client. To accomplish this, a proxy may need to translate a request received from a client, so that it may be sent and understood at a server. If a proxy does not employ a cache, then it simply forwards this translated request to the server. Otherwise, if it does employ a cache but does not have a stored response that matches the translated request and is considered fresh, then it needs to refresh its cache, e.g., through the validation mechanism.

Some limited context-awareness is included in the standard CoAP base protocol. In particular, standard CoAP allows for conditional request operations, where a client can ask a server to perform the request only if certain conditions specified by the client are fulfilled. If the given condition is not fulfilled, the server must not perform the requested method. Instead, the server must respond with the 4.12 (Precondition Failed) response code. On the other hand, if the condition is fulfilled, the server performs the request method as if the conditional request were not present.

The "condition" is conveyed to the server via a set of options. Standard CoAP defines two such conditional request options: If-Match and If-None-Match. Using If-Match, the request is conditioned on the current existence or value of an entity-tag (ETag) for one or more representations of a target resource. That is, the condition is fulfilled if the ETag of the target resource matches the supplied ETag in the condition request. Note that the client may specify an empty If-Match, in which case the condition is fulfilled if any representation exists for the target resource.

Using If-None-Match, the request is conditioned on the non-existence of the target resource. If the target resource does exist, then the condition is not fulfilled.

Figure 8:
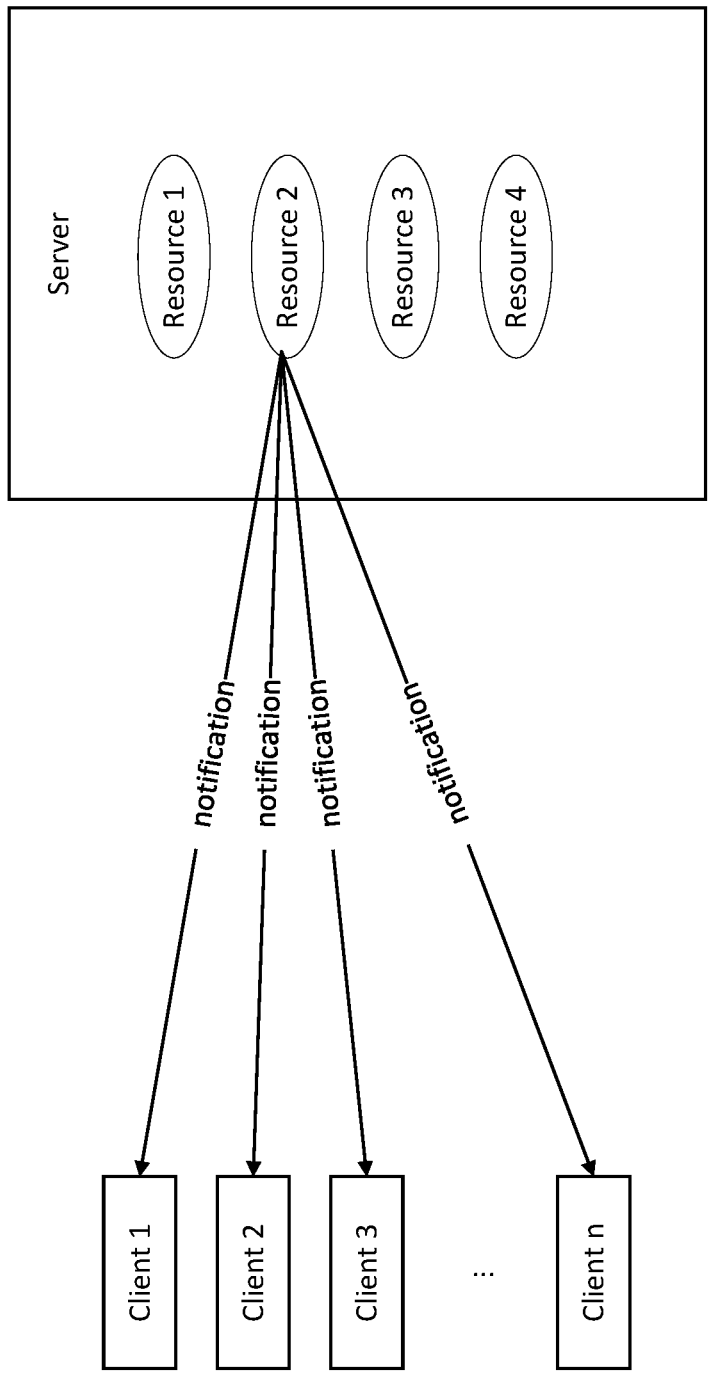
FIG. 8 is a schematic view of a network in which multiple clients observe a resource on a server.

Certain problems may arise due to the failure of standard CoAP to leverage context awareness more fully. FIG. 8 shows an example where multiple clients observe the same resource on a server. Each of the clients, 1-*n*, has setup an observe to the tagged resource 2. That is, these clients are on the list of observers of this tagged resource. When the state of the tagged resource changes, the server needs to notify all the clients on the list of observers. The server prepares a representation of the resource, and sends the representation via a response notification. The notification is sent as a separate unicast message to each of the clients, as described in Observing Resources in CoAP, draft-ietf-core-observe-16.

In such a scenario, every time there is a state change in the observed resource, the server sends the same resource representation in a separate message to each of the clients that is observing the resource. Consequently, if some clients are in the same local area, the server will send redundant unicast transmissions to notify each of these local clients. Further, the server is not leveraging the potential savings that could result if the clients on the list of observers formed a multicast group.

Figure 9:
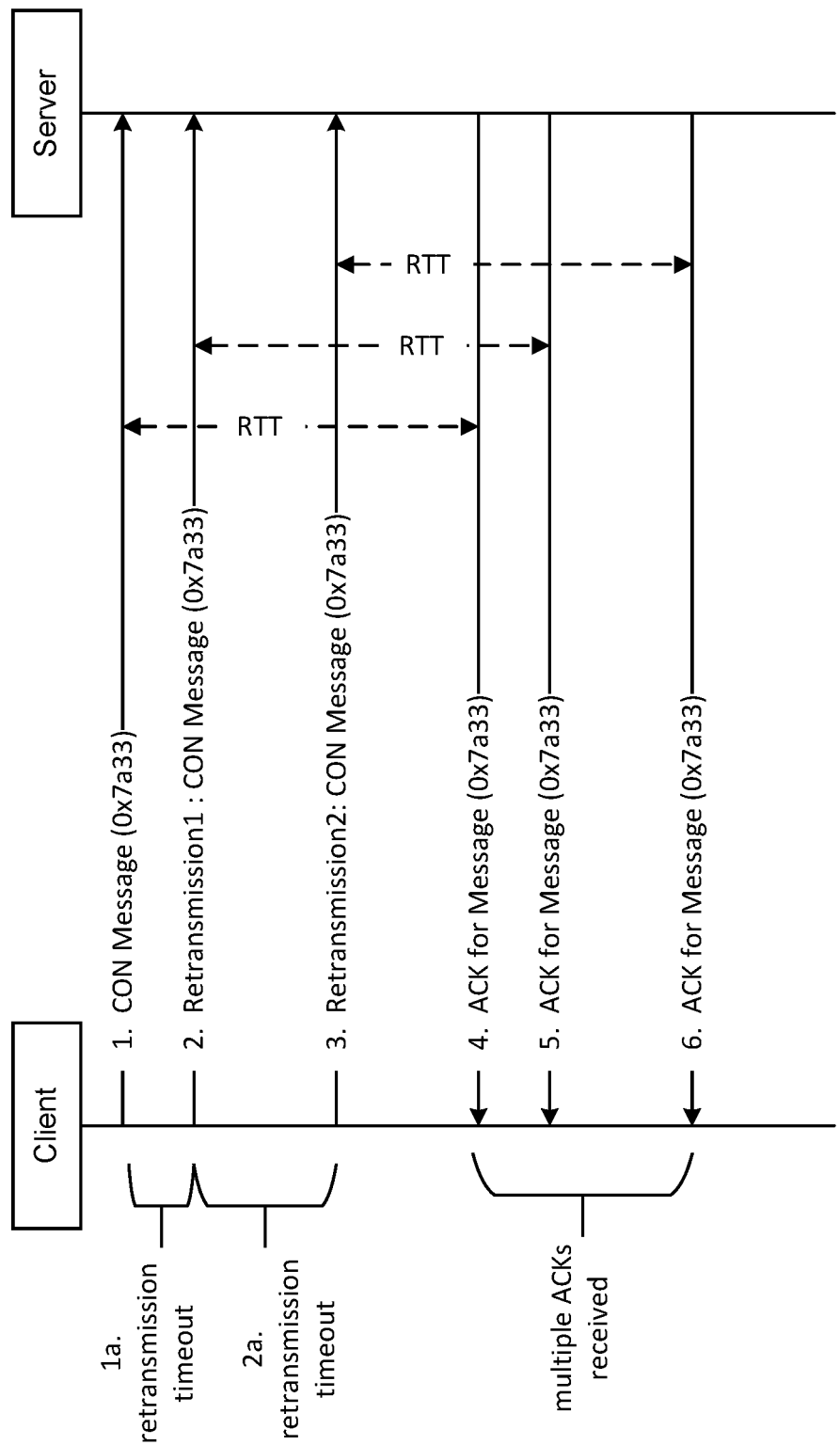
FIG. 9 is a call flow for an example where a client receives multiple acknowledgements for a single message.

FIG. 9 is a call flow for an example where a client receives multiple acknowledgements for a single message. The client communicates with a server in a deployment where the client-server round trip time (RTT) is larger than the retransmission timeout value. There are a number of factors that can contribute to the a large round trip time, such as: propagation delay between client and server; access delay for client and/or server, e.g., for endpoints relying on GSM or 3G links; computational complexity to prepare a response at a server; delays at the server, for instance due to sleep cycles; and delays caused by lower layer mechanisms to deal with sleepy nodes, e.g., WiFi supporting packet scheduling to deal with sleeping nodes. In the example of FIG. 9, the large round trip time results in acknowledgements that arrive very late.

The client needs to send a request reliably, so it uses a confirmable message 1. Message 1 has a message ID of 0x7a33, and relies on default transmission parameters, e.g. ACK_TIMEOUT=2 sec, and MAX_RETRANSMIT=4. An ACK is not received before retransmission timeout 1*a* expires. Therefore the client sends message 2, which is a first retransmission of message 1. Again, an ACK is not received before retransmission timeout 2*a* expires. Therefore the client sends message 3, which is a second retransmission of message 1.

Owing to the long round trip time, each of the first two transmissions time out. As a result, the client sends the CON message a total of three times. After the third transmission, the client receives a first ACK message 4 for a message with ID=0x7a33. The server sent this ACK message 4 in response to the initial new confirmable message 1 transmission. At this point the client knows that the transmission was successful, but it does not know whether the received ACK was for the initial new transmission or one of its retransmissions.

The server receives the three messages 1-3 from the client. In theory, the server may use the message ID to distinguish between the new message 1 transmission and retransmission messages 2 and 3. Furthermore it may guarantee that it will not act on multiple receptions of the same CoAP request, as noted in IETF RFC 7252, The Constrained Application Protocol (CoAP) standard. However, in practice, the server is not aware of whether its ACK messages 4-6 have arrived at the client or have been lost. Consequently, the server continues to acknowledge each received message. Hence the server sends message 5 in response to message 2, and sends message 6 in response to message 3. The result is that the client will subsequently receive ACKs for the 2 retransmissions from the client.

In FIG. 9, the retransmission messages 2 and 3 from the client to the server are redundant, since the server does receive the initial transmission message 1. Similarly, the 2nd and 3rd ACK transmissions from server to client, messages 5 and 6, are also redundant, as the client is already aware that the message transmission was successful.

Figure 10:
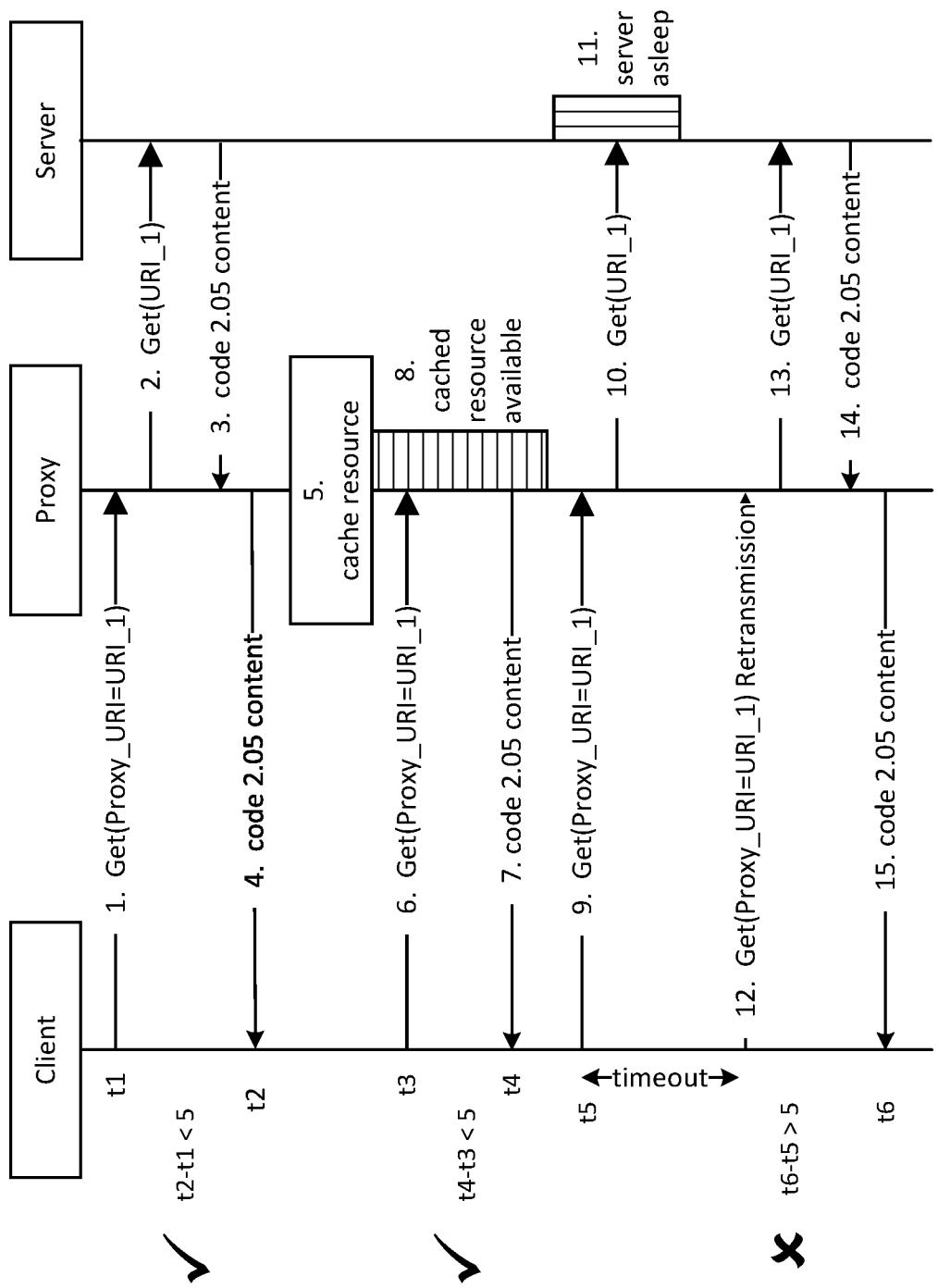
FIG. 10 is a call flow of an example of time sensitive retrieval of a resource representation from a proxy.

Here, the client is using a sub-optimum retransmission timeout value. The timeout value is not matched to the actual performance of the client-server link. While the CoAP standard protocol supports dynamic adjustment of this parameter, it does not provide a mechanism for doing so. See, e.g., section 4.8.1 of IETF RFC 7252. Consequently, this mismatch leads to redundant retransmissions from the client, redundant acknowledgements from the server, and unnecessary processing at the endpoints to deal with these redundant transmissions. Therefore, the network suffers: an unnecessary increase in congestion in the network; wasted message processing at both client and server; and wasted transmission energy, potentially impacting battery usage of the constrained devices FIG. 10 is a call flow of an example of time sensitive retrieval from a proxy. In this example, the client needs to retrieve a resource through a proxy. The retrieval of the resource is time sensitive. The response is only useful to the client if it is retrieved within five seconds. The origin server uses a sleep cycle to conserve energy, and as a result is occasionally slow to respond to requests.

At time t1, the client sends message 1 to ask the proxy for the resource for the first time. The proxy has no fresh representation for the requested resource, and so issues message 2 to retrieve to a representation from the origin server. At this time, the origin server is awake and quickly responds to the proxy in message 3. The proxy relays the representation in message 3 to the client in message 4 at time t2. Since t2-t1 is less than 5 sec, the client delay requirement is satisfied.

Message 3 also includes the information that the resource has a Max-Age of 60 seconds. Therefore, in step 5 the proxy caches the representation. At time t3, the client issues a new request message 6 to retrieve the resource. At time t3, the proxy still has a fresh cached representation, since the maximum age of sixty seconds, period 8, has not expired. Therefore, the proxy quickly answers message 6 by sending the representation in message 7 at time t4. Again the client delay requirement is met. Shortly thereafter, the proxy cache 8 expires.

Thereafter, at time t5, the client asks to retrieve the resource in message 9. The proxy needs to revalidate its cache with the origin server, and so sends a GET message 10. Unfortunately the origin server is asleep at this time, during period 11, and does not respond immediately. The client does not receive an answer prior to the timeout for message 9. Therefore the client retransmits its request as message 12, which the proxy again forwards, this time as message 13. By this time, the server has awoken, and responds with a representation in message 14. The proxy forwards this representation to the client in message 15, which arrives at the client at time t6. Owing to the delay at the origin server, (t6-t5)>5, and the delay requirement for the client is not satisfied. Consequently the client disregards the retrieved resource, and notifies the application.

In this example, the client is unable to use the resource retrieved in the last retrieval attempt. While an answer to message 12 is finally received in message 15, it is not useful. The associated exchanges between client-proxy and proxy-server added to the network load, but in the end they were wasted. This last retrieval attempt fails because the cached resource representation at the proxy is old, and therefore the representation needs to be revalidated. There is always a delay incurred in the revalidation and this delay may not be acceptable to certain clients.

To counter inefficiencies, such as those noted in reference to FIGS. 8, 9, and 10, nodes may use context awareness by drawing upon information available to the CoAP layer. Such context information may include, but is not limited to: connectivity information, such as the communication modes and pathways available to various endpoints, such as cellular, WPAN, WiFi, etc.; system information, such as operating system, applications, application status, memory status, battery status, time and date, etc.; resource information, such as the number and size of resources, the age/freshness of cached resources, the number of group resources, the group members, etc.; transmission information, such as transmission rate, timeouts, retries, etc., at the CoAP layer.

In short, the standard CoAP protocol relies on context awareness only as to the presence or absence of a resource to perform two conditional methods. Consequently, the protocol does not leverage the rich amount of context information that is available to the CoAP layer. The result is a protocol that is inefficient in certain cases, leading to extra load on the network and unnecessary processing at endpoints To avoid such inefficiencies, CoAP endpoints may use context awareness to perform one or more autonomous operations. Herein, these operations will be referred to as "procedures" as opposed to "methods" to avoid confusion with the term "method" as used in the context of CoAP communications. However, it will be appreciated that the procedures described here are examples of general methods of achieving the desired outcomes, and may be altered in the order of operations, number of steps performed, etc.

A management entity may be used to configure context aware procedures among various nodes in a network. The management entity may be a standalone node or a peer CoAP endpoint. The management entity may configure the procedures by enabling and/or disabling their operation, and may also monitor the activity of these procedures and convey context information from node to node. Normally, each endpoint may examine its own context information to execute context-aware procedures. If a management entity is not present, the configuration details for each context-aware procedure may be pre-configured in the endpoints, or determined by communication among endpoints, for example.

A management entity may configure a context-aware endpoint procedure by providing a set of operating parameters for the procedure. This may include providing trigger threshold values, observation times, size of history to be collected, etc. Alternatively, such operating parameters may be pre-configured in the endpoint. Further, the management entity may enable or disable the context-aware endpoint procedure. This is separate from configuring the procedure. By default, a context-aware procedure may be enabled at the time it is configured. Alternatively, a node may wait for a separate enablement instruction prior to running a context-aware procedure. Similarly, a management entity may disable the context-aware endpoint procedure.

The endpoint monitors the context based on the configuration of the procedure. The endpoint may further process monitored context information. For example, the endpoint may store history, compute averages, find a maximum, etc., based on the configuration of the procedure. If triggered, the endpoint performs the context-aware procedure. In addition, the endpoint may notify the management entity that the autonomous procedure was triggered at the endpoint. In describing various procedures below, it is assumed that the procedure parameters have already been configured and that the procedure is enabled.

A node may autonomously create a multicast group based on awareness of the context of the observations of a resource. Where many clients have registered "an observe" of a resource, a server may switch to multicast notification. That is, where more than one client has subscribed to receive updates from a server regarding changes in the states of a resource, the server may determine that update notification communications would be more efficiently managed by the creation of a multicast group, rather than unicast updates sent to each subscribing client. For example, a server may keep track of how many clients are observing each eligible resource and manage a group to optimize the notifications. The server may be capable of creating, updating, and deleting the group according to the number of active observations to the eligible resource. Similarly, another node monitoring the number of clients subscribing to updates to the resource, which may be a proxy, router, or management entity, for example, may be the node that creates the new group and/or manages its membership.

Figure 11:
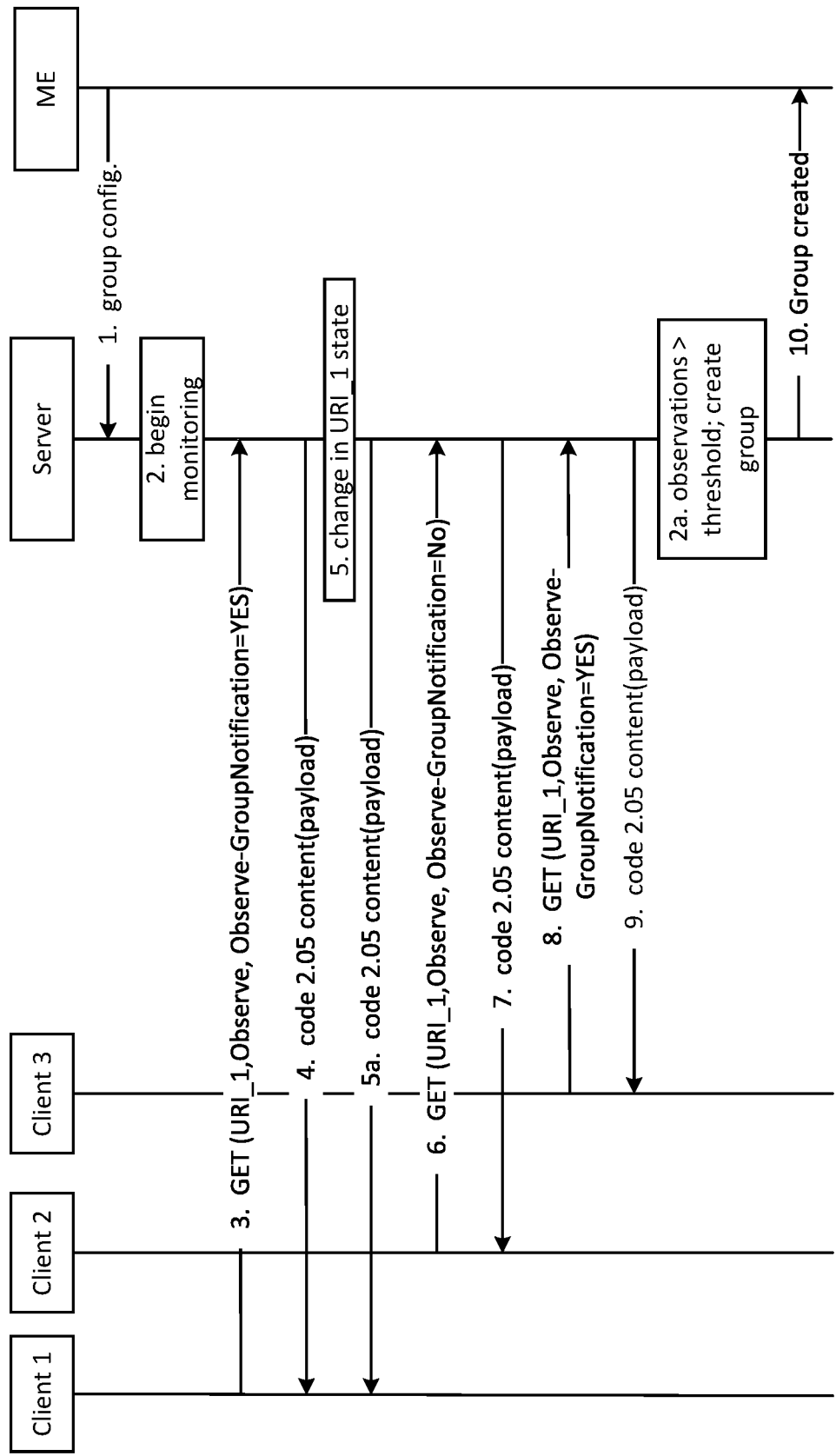
FIGS. 11 and 12 are call flows of an example procedure for establishing a multicast group based on the context of requests to observe a resource.
Figure 12:
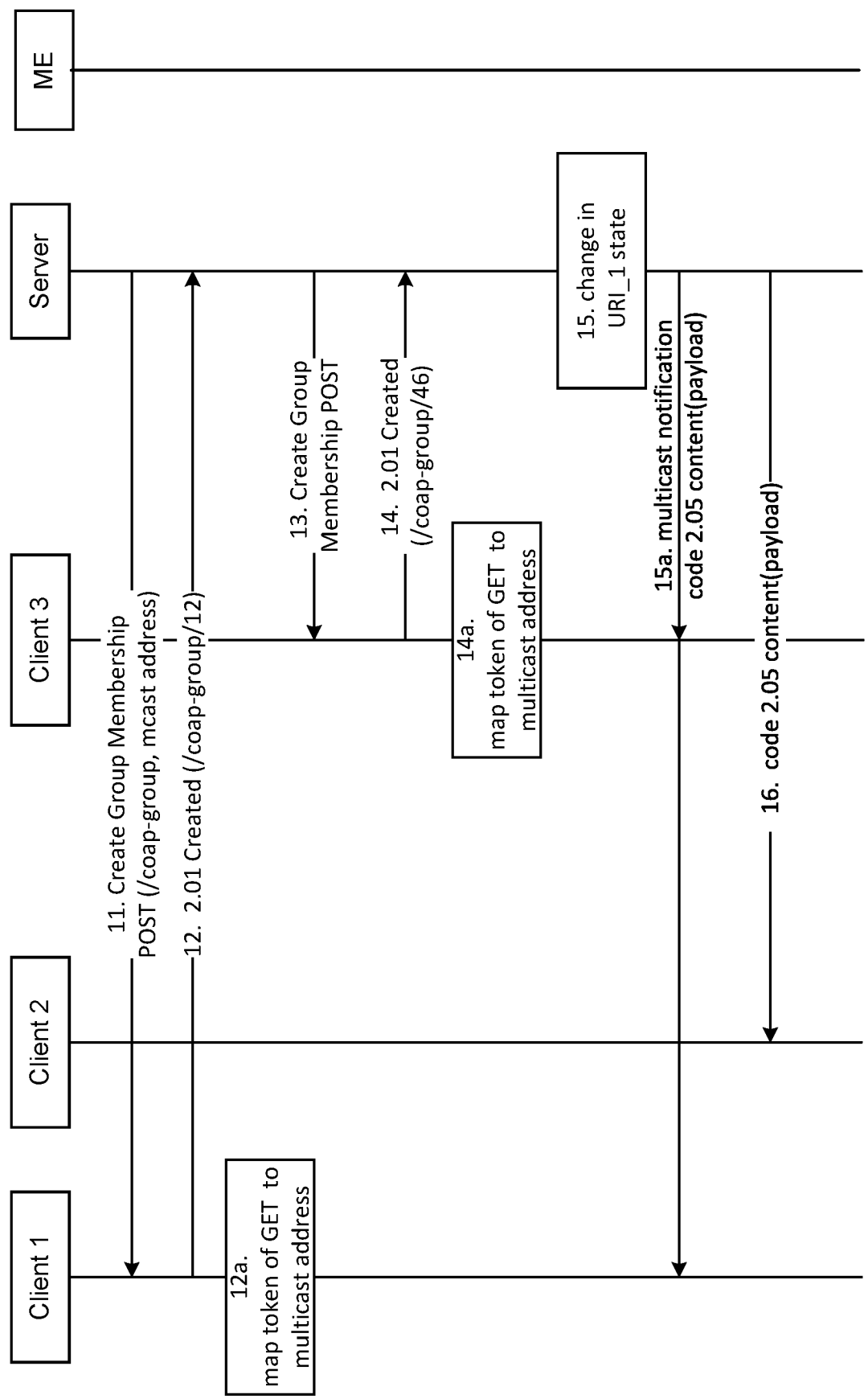

FIGS. 11 and 12 show call flows of an example procedure for establishing a multicast group based on the context of resource observes. In FIG. 11, a management entity (ME) sends parameters for a conditional context-aware multicast group creation procedure to a server in message 1. In message 1, the management entity may notify the server about the list of resources that are eligible for autonomous group creation, referred to as an "observe group". The ME may also specify the configuration parameters associated with the autonomous group creation. For example, the ME may provide an observe multicast delete threshold, which is the minimum number of clients in a list of observers to a resource. Below this level, a multicast group for an observe may be deleted. The ME may also provide an observe multicast create threshold, which is the number of clients in list of observers to a resource which will trigger the creation of a multicast group to which updates of the observed resource will be broadcast.

The ME may use a new Observe Group Configuration RESTful interface for this purpose. A new observe group may be created with a POST method to path "observe-group", where the content contains a list of eligible resources, and the configuration parameters for the observe group. The returned result includes an index to the observe group. For example, message 1 may contain a request of "POST/observe-group" and content including configuration parameters for the observe group and list of resources which should be monitored for a potential group observe, such as the following:

"OBSERVE_MULTICAST_CREATE_THRESHOLD": "2",
"OBSERVE_MULTICAST_DELETE_THRESHOLD": "1"
"URI-1", "URI-2"

The server may respond with a message, not shown in FIG. 11, containing the following:
Result: 2.01 Created
Location-Path: /observe_group/12

Optionally, the thresholds set for triggering group creation and/or group deletion could be URI specific. That is, each eligible URI may have its own values for group creation and deletion thresholds.

In step 2, the server begins to monitor the resources in an observe group that includes the eligible resources. In step 3, a client 1 makes a request 3 to observe eligible resource URI-1. In request message 3, client 1 specifies as an option that it is willing to accept a group observe notification. This may be signaled through an observe option. For example, message 3 may contain:

Observe-GroupNotification=Yes

Like other non-standard protocol features described herein, Observe-GroupNotification may be achieved as a new option in an extension to standard CoAP. Similarly, it may be achieved as a new parameter in an extension to standard CoAP Observe option.

This option allows a client to tell the server whether or not it is willing and able to receive a group notification. For instance, the client may not want to observe a multicast address, or it may want to receive a confirmable unicast notification.

In response to message 3, the server adds client 1 to a list of observers for resource URI-1 and sends a response 4 to client 1. Since resource URI-1 is an eligible resource, as configured in message 1, the server checks whether the number of observers is now sufficient to trigger autonomous creation of a multicast group. The configured threshold is two, and presently client 1 is the only observer. Since the number of observers is less than the configured threshold, no group is setup.

Alternatively, an endpoint may automatically set up a group as soon as there is one member in the list of observers to an eligible resource, whereby group creation does not rely on any threshold per se. Instead, all clients to an observable and eligible resource would always be configured with a multicast address to receive notifications, thereby avoiding the potential need to reconfigure from/to unicast reception to/from multicast reception.

At time 5, the server becomes aware of a state change in resource URI-1. The server then sends a unicast response notification message 5a to client 1.

Next, client 2 makes a request 6 to observe eligible resource URI-1. Request 6 specifies as an option that client 2 is NOT willing to accept a group observe notification. This may be signaled through an observe option. For example, message 6 may contain:

Observe-GroupNotification=No

The server adds client 2 to the list of observers for resource URI-1, and responds to the observe request from client 2 with a message 7. Message 7 includes a representation of the observed resource.

Since resource URI-1 is an eligible resource, the server may again check whether the number of observers is sufficient to trigger autonomous creation of a multicast group. The configured threshold is two, and presently client 1 is the only observer willing to accept a multicast. Since the number of observers willing to accept membership in a group is less than the configured threshold, no group is setup.

Next, client 3 makes a request 8 to observe eligible resource (URI-1). In request 8, the client specifies as an option that it is willing to accept a group observe notification. This may be signaled through an observe option. For example, request message 8 may contain:

Observe-GroupNotification=Yes

The server adds client 3 to the list of observers for resource URI-1, and responds to the observe request from client 3 with a message 9. Message 9 includes a representation of the observed resource.

In step 2a, since resource URI-1 is an eligible resource, the server may again check whether the number of observers is now sufficient to trigger autonomous creation of a multicast group. The configured threshold is two, and presently client 1 and client 3 are now observers that are willing to accept a multicast. Since the number of observers willing to accept membership is sufficient, a group is created. The group has two members, client 1 and client 3.

The server may notify the management entity in a message 10 that an observe group has been created. Message 10 may specify the resource, which in this case is URI-1. This information may be used by the management entity to maintain statistics regarding the group notifications to a resource, and possibly to change the configuration parameters, as needed.

The call flow started in FIG. 11 continues in FIG. 12. Referring to FIG. 12, the server next uses the Membership Configuration RESTful interface to create a group membership in client 1. In message 11, the server provides the multicast address to use for future notifications for the observe. In message 12, client 1 confirms the group creation. In step 12a, client 1 configures the group membership, and associates the assigned multicast address with the token used in the initial GET request message 3 of FIG. 11. This allows client 1 to know the GET request that is being responded to by any future multicast notification. Similarly, in message 13, the server creates a group membership in client 3, which client 3 confirms in message 14 and processes in step 14a.

At time 15, there is a state change in resource URI-1. Therefore the server sends a multicast notification 15a to the observe group. Message 15a is received by client 1 and client 3 accordingly. Separately, the server sends a unicast notification to any clients that are on the list of observers but not in the observe group. Therefore the server sends unicast notification 16 to client 2.

In step 2a of FIG. 11, the decision to start a group notification is based entirely on the number of clients observing a resource that would accept group notification. However, the decision may be enhanced by considering the topology of the clients. For instance, if the routing paths between the server and the clients share many intermediate routing nodes, there is a greater benefit to using a multicast notification. The server may obtain and maintain a list of intermediate nodes between itself and the clients. This may be achieved through some route trace mechanism triggered by the observe registration. For example, upon receiving an observe request to an eligible resource with Observe-GroupNotification=Yes, the server may: determine the number of observers to the eligible resource; determine the intermediate routing nodes between itself and the client; and determine the number of common intermediate nodes shared with other clients. For example, the server may set up a group if both the number of observers exceeds a first configured threshold and the number of common intermediate routing nodes exceeds a second configured threshold.

Figure 13:
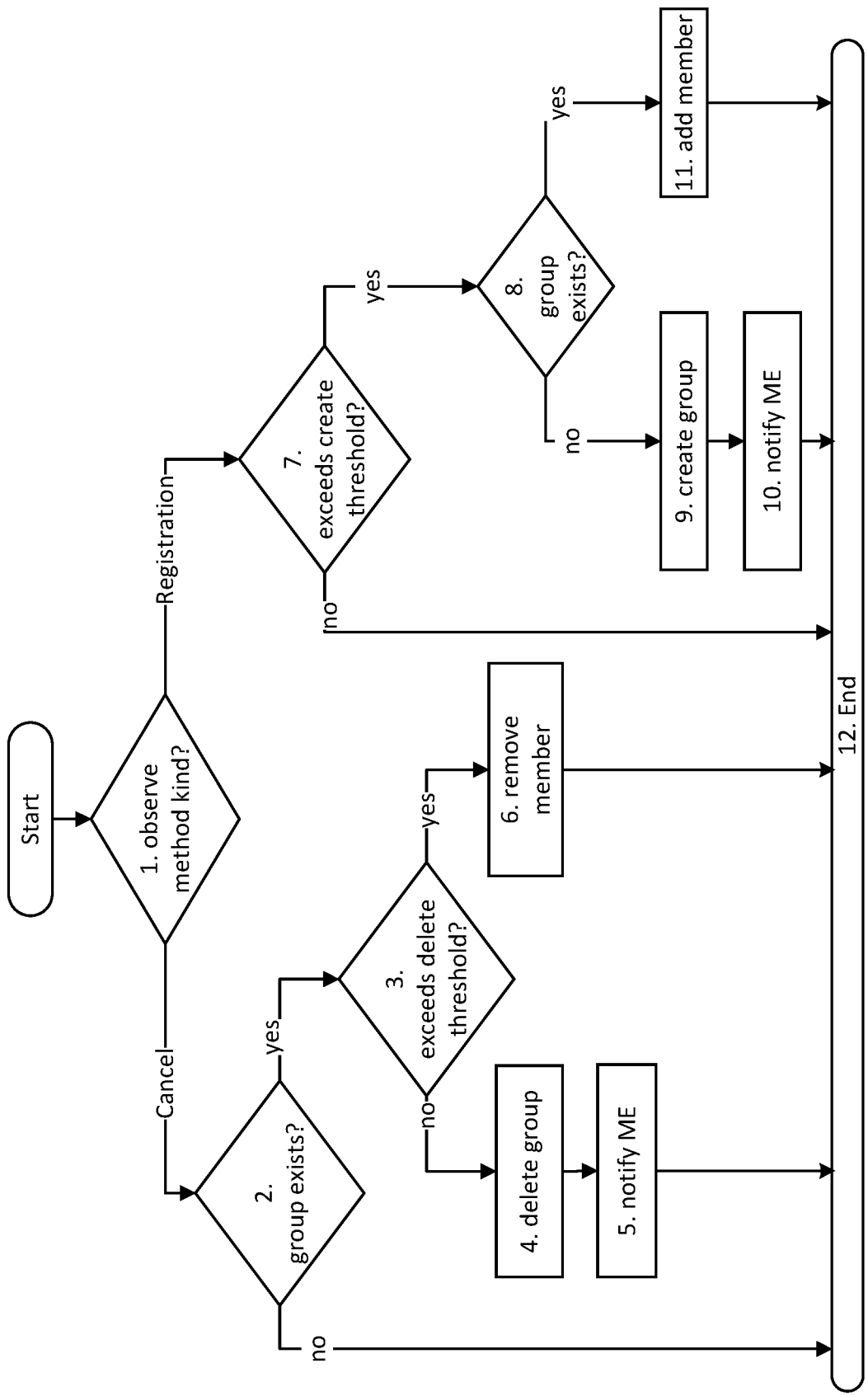
FIG. 13 is a flow chart of an example procedure for the autonomous creation of a multicast group by a node such as a server.

FIG. 13 is a flow diagram of an example procedure for the autonomous creation of a multicast group by a node such as a server. The procedure starts when there is a change in the observe registration of an eligible resource, such as a new registration or a cancellation of a registration.

In step 1, the node checks the type of change. If the client has issued an observe registration to the eligible resource, the procedure goes to step 7. If the client has cancelled a prior observe registration to the eligible resource, the procedure goes to step 2.

In step 2, the node checks whether there is already a multicast observe group for the eligible resource. If so, the procedure goes to step 3. If not, the procedure goes to step 12.

In step 3, if the number of active observes on the eligible resource is below an OBSERVE_MULTICAST_DELETE_THRESHOLD, the multicast observe group needs to be deleted, and the procedure goes to step 4. Else, only this client needs to be removed from the group, and the procedure goes to step 6.

In step 4, the node deletes the group and notifies all clients with an active observe on the eligible resource that future notifications will be sent to the client's unicast address. This may be achieved through the membership configuration interface described in IETF RFC 7390. In step 5, the node server may optionally notify other nodes, such as a management entity, of the group deletion.

In step 6, the node updates the multicast group by removing the client from the list of members. The client is also instructed to delete its group membership and, as a result, to stop monitoring the multicast address. Alternatively, the client may autonomously delete its membership in a group and stop monitoring the multicast address if the observe on the resource is cancelled In step 7, if the number of active Observes on the eligible resource exceeds an OBSERVE_MULTICAST_CREATE_THRESHOLD, the multicast observe group needs to be updated, and the procedure goes to step 8. Else, the procedure ends.

In step 8, the node checks whether there is already a multicast observe group for the eligible resource. If not, the multicast group has to be created in step 9. Otherwise, the procedure goes to step 11.

In step 9, the node creates a new multicast group with members which are the clients with active observe on the eligible resource. The node assigns a multicast address for this group. A multicast address is assigned for each observable resource that triggers multicast notifications. The server then informs the clients of their new group membership. This may be achieved through the membership configuration interface described in IETF RFC 7390.

In step 10, the node may optionally notify other nodes, such as a management entity, of the group creation.

In step 11, the node adds the client as a new member to the existing multicast observe group. The node notifies the client of its new group membership. This may be achieved through the membership configuration interface described in IETF RFC 7390.

Figure 14:
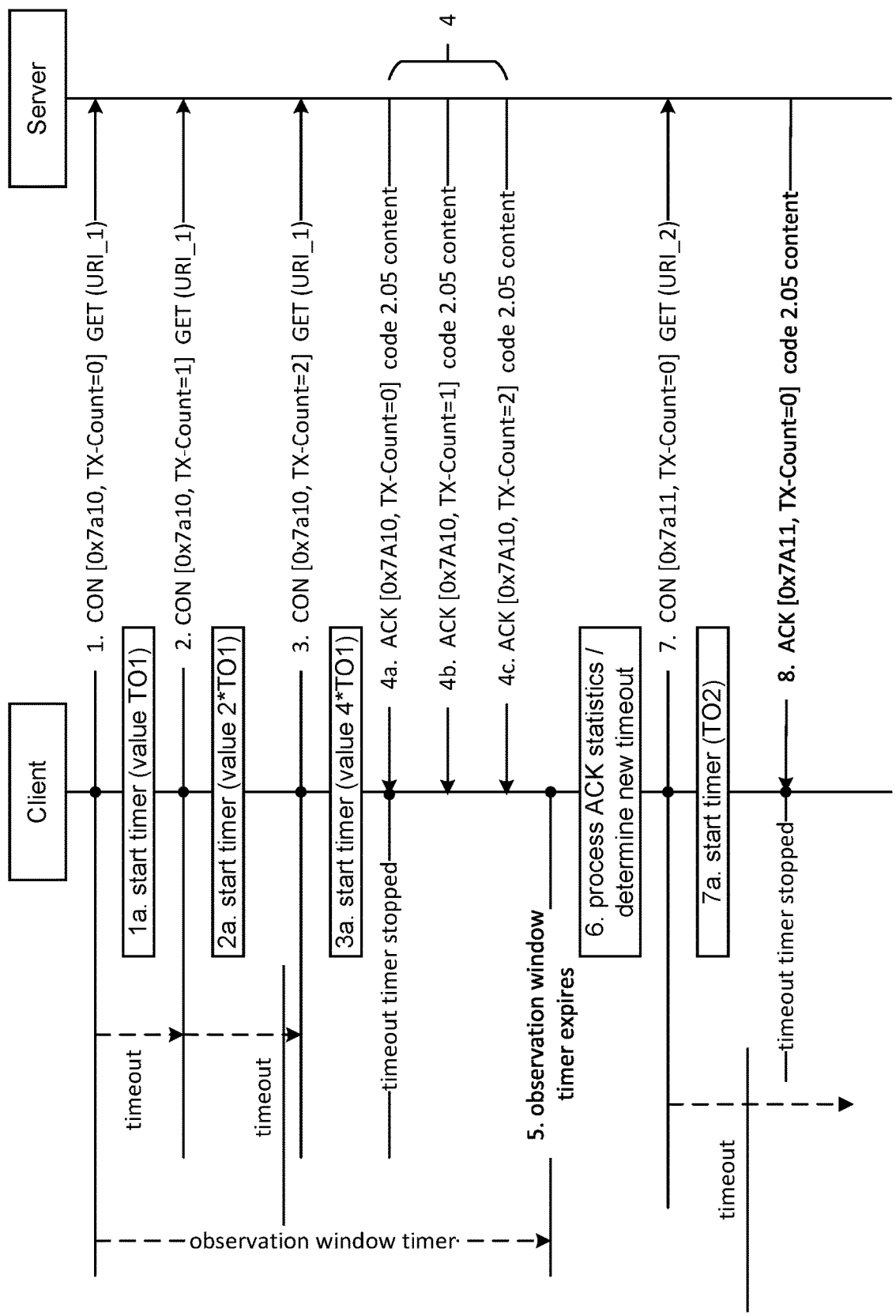
FIG. 14 is a call flow of an example procedure whereby a node may dynamically adjust transmission parameters.

FIG. 14 shows a call flow of an example procedure whereby a node may dynamically adjust transmission parameters based on retransmission context awareness. For example, after sending confirmable messages, a client may keep track of the number of acknowledgement messages received for each confirmable message and the delay in receiving the acknowledgement message for each Confirmable message transmission. Based on this, the node may dynamically change its ACK_TIMEOUT, for example.

Note that it is assumed that a client may modify the ACK_TIMEOUT for each individual client-server link or sets of client-server links. The objective is to set ACK_TIMEOUT to an optimum value that on the one hand keeps message exchanges short, yet on the other hand minimizes the number of retransmissions resulting from late acknowledgements. If ACK_TIMEOUT is large, the probability of a client missing a late acknowledgement is reduced, but the client would have to wait longer to transmit any retransmissions. Similarly if ACK_TIMEOUT is small, the client can more quickly send retransmissions, but there is a higher probability of a client missing a late acknowledgement.

Referring to FIG. 14, at time 1 a client sends a confirmable message 1 to the server. In step 1a, the client starts an observationWindowTimer. The value of the timer is how long the client is willing to wait for acknowledgements for message 1. This timer may be, e.g., a MAX_TRANSMIT_WAIT or EXCHANGE_LIFETIME as defined in IETF RFC 7252. In step 1a the client also starts a timeout timer (with the timer set to T01). The client may optionally include a transmission count in the confirmable message that informs the server whether this were a first transmission, a second transmission, etc. This may be included in a TX-Count option. For example, message 1 may include:

TX-Count=1

At time 2, which is T01 later than time 1, the timer expires before the client has received an acknowledgement. Therefore the client retransmits confirmable message 1 as message 2. Message 2 optionally includes a TX-Count option set to 2. In step 2a, the client restarts the timeout timer, sets the timer to T02, which is double the first value used, T01.

At time 3, which is 2×T01 later than time 2, the client times out again and retransmits the confirmable message again as message 3. Again, message 3 optionally includes a TX-Count option set to 3. In step 3a, the client restarts the timeout timer and sets the time to double the last value used, and so now the timer is set for 4×T01.

At time 4a, before the expiration of the timeout timer, the client receives an acknowledgement 4a, which is the server's acknowledgement for message 1. This is followed by acknowledgements 4b and 4c corresponding to client messages 2 and 3 respectively. Each ACK may optionally contain a TX-Count option that indicates which message transmission is being acknowledged.

For a window of time starting at time 1 and ending at time 5 (expiry of the observationWindowTimer), the client monitors responses to the messages it sends and maintains statistics such as the ACK count and the ACK delay. In step 6 the client processes the ACK statistics and determines the new timeout value T02 for the client-server link. The determination is discussed below in reference to FIG. 15.

At time 7, the client sends a new confirmable message 7 to the server. In step 7a, the client sets the transmission timeout timer to T02 as calculated in Step 6. T02 accounts for, e.g., transmission delays observed between the sending of messages 1, 2, and 3 and the receipt of ACKs, 4a, 4b, and 4c, respectively. ACK 8 arrives at time 8, before the expiration of the adjusted timeout timer.

While the example call flow of FIG. 14 depicts a procedure running at a client, it will be appreciated that such a procedure may be used at any endpoint transmitting a confirmable message, and apply to each confirmable message exchange. Thus, the statistics may be used to evaluate each individual client-server/node-node link. Based on such evaluations, the client may increase or decrease the ACK timeout for each link accordingly. A dynamic timeout algorithm may, for example, make use of the variables and parameters show in Table 4.

TABLE 4

Variables for Dynamic ACK_TIMEOUT Algorithm

| Variable Name | Description |
| --- | --- |
| msgACKCount[j] | Number of acknowledgements received for message j |
| msgACKDelay[j] | Average acknowledgement delay (RTT) for transmission of message j |
| CS_ACKCount | Average number of acknowledgements for each transmission on a specific client-server link. Based on msgACKCount[j]. |
| CS_ACKDelay | Average acknowledgement delay (RTT) for specific client-server link. Based on msgACKDelay[j]. |
| TO_INCREASE_THRESHOLD | Timeout Increase threshold. Configuration parameter - Threshold above which an ACK count for a client-server link will trigger a timeout increase |
| TO_INCREASE_DELTA | Configuration parameter - If timeout increase is triggered, denotes the amount of increase |
| TO_INCREASE_FACTOR | Configuration parameter - If timeout increase is triggered, denotes the factor by which the timeout is increased |
| MAX_ACK_TIMEOUT | Configuration parameter - Maximum timeout value after a timeout increase |
| TO_DECREASE_THRESHOLD | Timeout Decrease threshold. Configuration parameter - Threshold below which an ACK count for a client-server link will trigger a timeout decrease |
| TO_DECREASE_DELTA | Configuration parameter - If timeout decrease is triggered, denotes the amount of decrease |
| TO_DECREASE_FACTOR | Configuration parameter - If timeout decrease is triggered, denotes the factor by which the timeout is decreased |
| MIN_ACK_TIMEOUT | Configuration parameter - Minimum timeout value after a timeout decrease |

Figure 15:
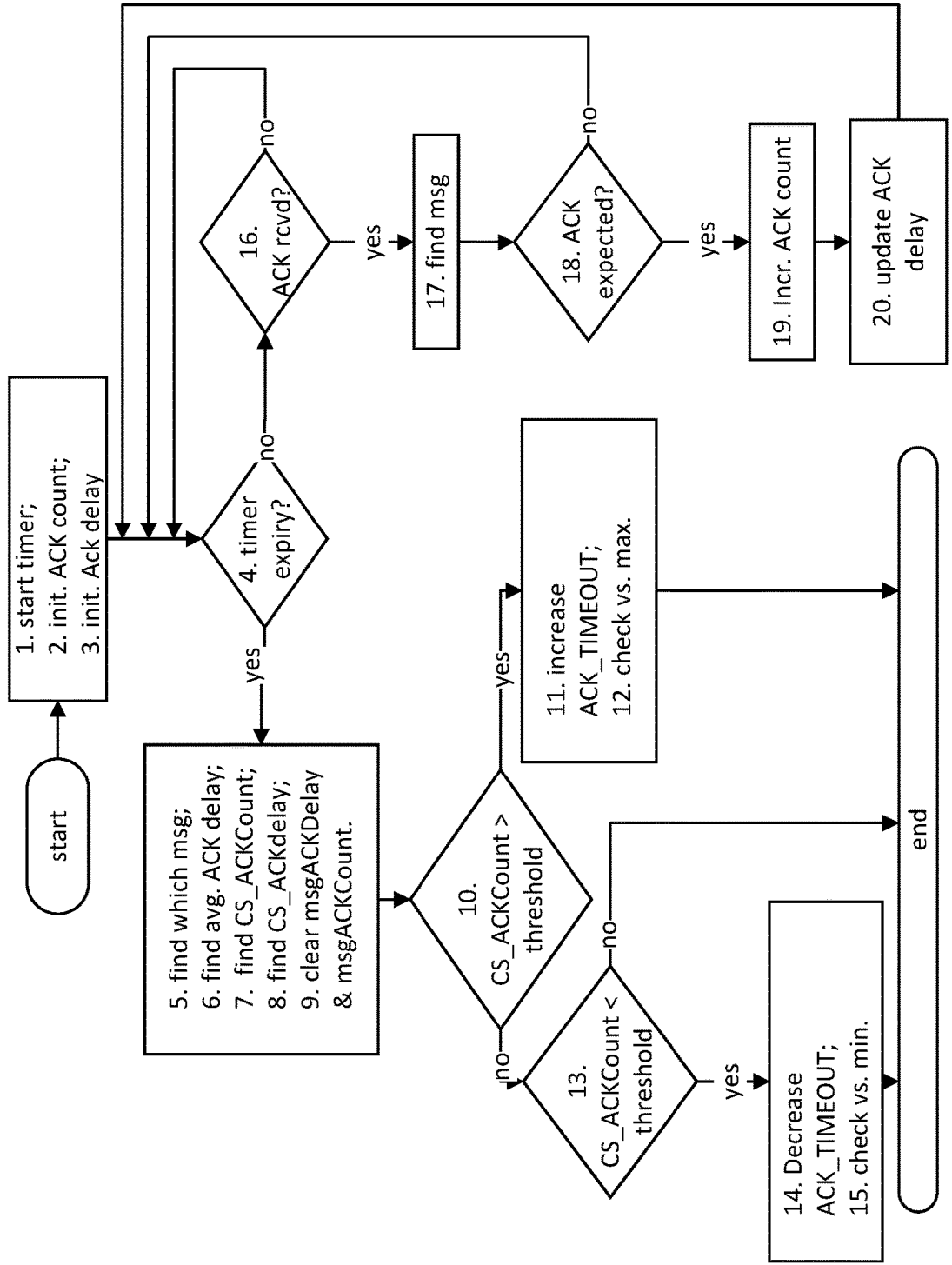
FIG. 15 is a flow diagram of an example procedure whereby a node may dynamically compute a transmission timeout.

FIG. 15 is a flow chart of an example procedure whereby a node may dynamically compute an ACK timeout. The procedure starts upon transmission of a confirmable message msg_i to a server. In step 1, the node starts an observation-WindowTimer. This timer may be set, for example, to MAX_TRANSMIT_WAIT or EXCHANGE_LIFETIME as defined in IETF RFC 7252.

In step 2, the node initializes an ACK count for this message e.g., msgACKCount[msg_i]=0. The ACK count maintains the number of acknowledgements received for message msg_i.

In step 3, the node initializes an ACK delay for this message, e.g., msgACKDelay[msg_i]=0. The ACK delay maintains a running sum of the delay between the transmission/retransmission of msg_i and its corresponding acknowledgement. To facilitate this, optionally the confirmable message may contain a retransmission count that is echoed in the acknowledgement message. This allows the node to link the acknowledgement with the message transmission or retransmission. This count may be included in a TX-Count option.

The node then waits for acknowledgements or the expiration of the observationWindowTimer. In step 4, the node checks for the expiry of the observationWindowTimer. If the window timer has expired, then the procedure goes to step 5. If it has not expired, the procedure goes to step 16.

In step 5, the node determines which message triggered the timer expiry, e.g., msg_i. In step 6, the node calculates a statistic for the acknowledgement delay for this message. For example, this could be an average:

msgACKDelay[msg_i]=msgACKDelay[msg_i]/msgACKCount [msg_i]

In step 7, the node determines a client-server ACK count (CS_ACKCount). This is a measure of the "typical" number of acknowledgments for the node-node link for the particular message. For example, this may be a moving average that relies on the observed msgACKCount [msg_i].

In step 8, the node determines a client-server ACK Delay (CS_ACKDelay). This is a measure of the "typical" delay to receive an acknowledgment for the node-node link. For example this may be a moving average that relies on the observed msgACKDelay[msg_i].

In step 9, the node clears the monitored results for message msg_i, e.g., msgACKCount [msg_i] and msgACKDelay[msg_i].

In step 10, the node checks whether the CS_ACKCount is greater than the TO_INCREASE_THRESHOLD. If yes, the procedure goes to step 11. If no, the procedure goes to step 13.

In step 11, the node increases the ACK_TIMEOUT for this node-node link. The increase may be based on a configured amount or a configured factor. Alternatively, the ACK_TIMEOUT may be set based on the observed CS_ACKDelay in step 8. For example, the following formulas may be used:

ACK_TIMEOUT=ACK_TIMEOUT+TO_INCREASE_DELTA

ACK_TIMEOUT=ACK_TIMEOUT*TO_INCREASE_FACTOR

ACK_TIMEOUT=CS_ACKDelay

In step 12, the node makes sure that the ACK_TIMEOUT is below a maximum, and the procedure is complete. For example, the following formula may be used:

ACK_TIMEOUT=MIN(ACK_TIMEOUT,MAX_ACK_TIMEOUT)

In step 13, the node checks whether the CS_ACKCount is less than the TO_DECREASE_THRESHOLD. If yes, the procedure goes to step 14. Otherwise the procedure ends.

In step 14, the node decreases the ACK_TIMEOUT for this node-node link. The decrease can be based on a configured amount or a configured factor. Alternatively, the ACK_TIMEOUT may be set based on the observed CS_ACKDelay in step 8. For example, the following formulas may be used:

ACK_TIMEOUT=ACK_TIMEOUT-TO_DECREASE_DELTA

ACK_TIMEOUT=ACK_TIMEOUT*TO_DECREASE_FACTOR

ACK_TIMEOUT=CS_ACKDelay

In step 15, the node makes sure that the ACK_TIMEOUT is above some minimum, and the procedure is complete. For example, the following formula may be used:

ACK_TIMEOUT=MAX(ACK_TIMEOUT,MIN_ACK_TIMEOUT).

In step 16, if an acknowledgement has been received, the procedure goes to step 17. Otherwise the procedure returns to step 4.

In step 17, the node determines which message has been acknowledged, e.g., msg_i. The node may use the message ID to make this determination.

In step 18, the node checks whether there is an acknowledgement expected for this message msg_i. If yes, the procedure goes to step 19. If not, then this acknowledgement can be ignored. For example, the acknowledgement may be very late. If the acknowledgement can be ignored, then the procedure returns to step 4.

In step 19, the node increments the ACK count maintained for this message, e.g., msgACKCount[msg_i]++.

In step 20, the node updates the sum of all ACK delays for this message, e.g., (msgACKDelay[msg_i]=msgACKDelay[msg_i]+(current time−message transmission time)). Thereafter the procedure returns to step 4

There are a number of variations, not shown, for the example procedure illustrated in FIG. 15. In the example FIG. 15, the adjustment of ACK_TIMEOUT adjustment is triggered every time the observationWindowTimer expires. That is, the trigger is when the node has finished waiting for acknowledgements for each confirmable message. Alternatively, since the node is aware of the number of transmissions of message, it is also capable of triggering the adjustment when it has received all the acknowledgements it was expecting. In other words, if a client has transmitted a message K times, it may trigger the adjustment processing when it has received K Acknowledgements for this message, even if the observationWindowTimer has not expired. In such a case, the node may stop the timer before proceeding with the adjustment. Alternatively, the node may adjust the ACK_TIMEOUT periodically, e.g., once every M seconds.

In the example of FIG. 15, the adjustment is made per node-node link, e.g., for each client-server link. Alternatively, the adjustment may be made per node, e.g., per client, whereby the client may monitor all client-server links and select the best ACK_TIMEOUT to satisfy as many links as possible.

A proxy may use context awareness to proactively refresh a representation of a resource. Under standard CoAP protocols, without the use of context-awareness, refresh is either client-driven or server-driven. For client-driven refresh, when the client asks a proxy for a resource and that resource is stale, e.g., its age exceeds Max-Age, the proxy may then either retrieve a fresh copy of the resource from the origin server or validate one of its stored representations of the resource. For server-driven refresh, the proxy sets up an observe on the original resource and the proxy is notified whenever the status of the resource on the origin server changes.

Context-aware alternatives are possible, whereby a client may supply a Proxy-URI, as well as a set of proxy options. The proxy options may include a proxy refresh type, such as observe-based or validation-based. In the observe-based option, the proxy will set up an observe on the desired resource at the server, and indicate to the server that the proxy wants to keep the cache fresh at all times. In the validation-based, the proxy will keep track of the age of the cached resource, and trigger a validation before the cache expires, i.e., before the cache becomes "no longer fresh" or "stale." Here a validation means that either the proxy validates an existing resource representation or re-fetches the resource.

The proxy options may also include a proxy freshness-duration, whereby a client requests a proxy to maintain the freshness of a resource for a certain period of time. The client may specify a specific duration, e.g., 180 seconds, or it may specify "always." For the latter, the client is asking the proxy to maintain the resource fresh until the request is cancelled by the client.

Figure 16:
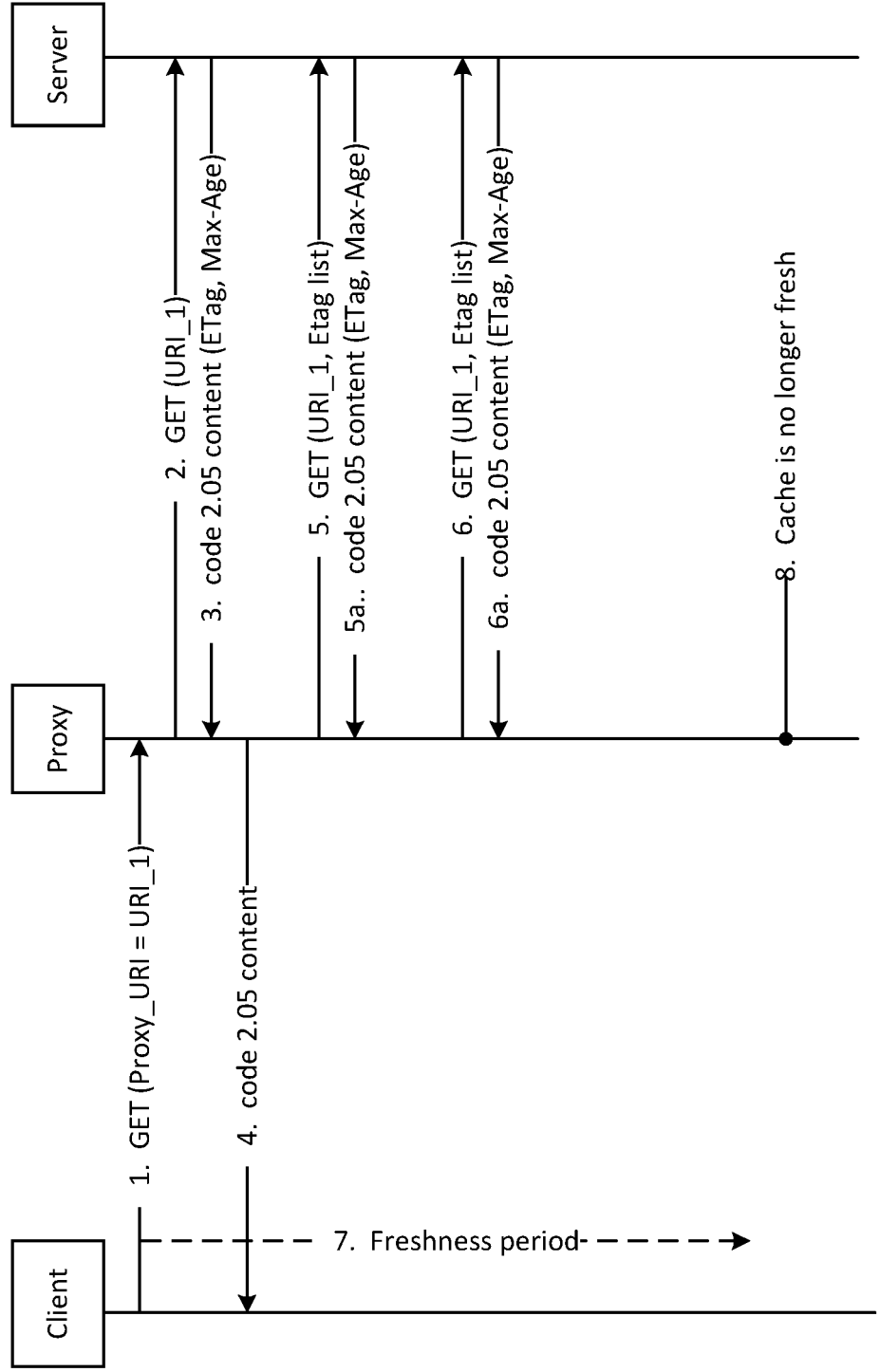
FIG. 16 is a call flow of an example use of a validation-based context-aware proxy refresh.

FIG. 16 is a call flow of an example use of a validation-based context-aware proxy refresh, whereby a CoAP client communicates with a CoAP proxy to receive representations of a resource residing at a CoAP server. The client issues a GET request message 1 to the proxy. Message 1 may, for example, specify the following:

Proxy-Refresh-Type=Validation Based
Proxy-Freshness-Duration=(e.g. 180 sec)

The proxy does not have a stored response that matches the request, so the proxy issues a GET request message 2 to the server. The proxy also starts a freshness timer, not shown. The duration of the timer is based on the Proxy-Freshness-Duration specified by the client. Since the proxy may receive requests from more than one client, it may consider all these requests, and do certain aggregation/processing to determine the freshness timer duration to satisfy the requests from the different clients. For example, upon receiving multiple requests with different Proxy-Freshness-Durations, the freshness timer may be set to the maximum of these. This will guarantee that all client requests are satisfied. Similarly if a client request is received while the timer is already running, the proxy server may evaluate whether the timer needs to be extended. If the request Proxy-Freshness-Duration exceeds the time remaining on the freshness timer, the proxy may reset the timer. Alternatively, if the request Proxy-Freshness-Duration is less than the time remaining on the freshness timer, the client request is already being satisfied, and no further action is necessary.

In response to message 2, the server supplies the requested resource in message 3. Message 3 may optionally include other information, such as the ETag and Max-Age of the resource. After receiving message 3, the proxy forwards the requested information to the client in message 4. The resource representation is also stored on the proxy in a step not shown. Prior to the expiry of the cached resource representation, the proxy proactively fetches the resource, to validate the cached resource representation, by sending GET messages 5 and 6 and receiving responses 5a and 6a. In the example of FIG. 16, the information in messages 5a and 6a is not forwarded to the client.

After a period 7, the freshness timer expires. Therefore, at time 8, although the resource representation at the proxy is stale, the proxy is no longer required to revalidate the resource.

Figure 17:
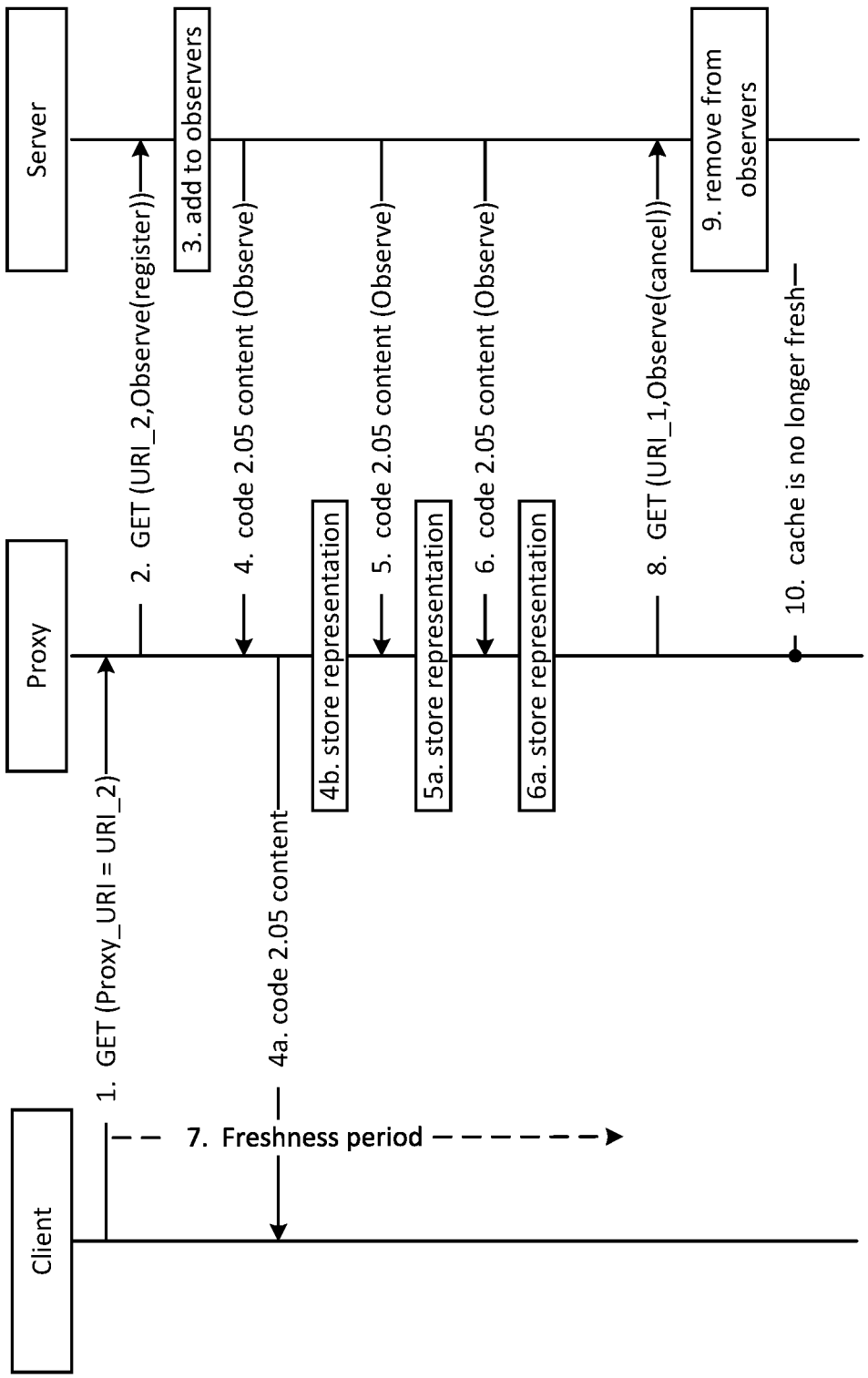
FIG. 17 is a call flow of an example use of an observe-based context-aware proxy refresh.

FIG. 17 is a call flow of an example use of an observe-based context-aware proxy refresh, whereby a CoAP client communicates with a CoAP proxy to receive representations of a resource residing at a CoAP server. The client issues a GET request message 1 to the proxy. Message 1 may specify the following:

Proxy-Refresh-Type=Observe Based
Proxy-Freshness-Duration=(e.g. 180 sec)

The proxy does not have a stored response that matches request 1 so it issues a GET request 2 to the server. In message 2 the proxy specifies Observe=0 to signal that it wants to Observe the resource. The proxy also starts a freshness timer whose value is set as described for the validation based scheme described in reference to FIG. 16.

In step 3 the server adds the proxy to a list of observers of the resource. The server supplies the requested resource in message 4. Message 4 may include an observe option to indicate that it has added the proxy to the list of observers for this resource.

The proxy receives message 4 and forwards the requested information to the client in message 4a. In step 4b, the proxy stores the resource representation. When the resource at the origin server changes, the server sends update notifications to the proxy in messages 5 and 6. In steps 5a and 6a, respectively, the proxy stores these new representations.

After a period 7, the freshness timer expires. The proxy sends an observe cancellation message 8 to the server.

In step 9, the server removes the proxy from the list of observers of the resource. At a time 10, the cached resource representation expires, and the proxy has no fresh representation of the resource.

signal that it wants to observe the resource, and Observe-Freshness=on, to signal that the server should try to keep the cached resource fresh by sending notifications before the cached resource representation expires. In step 3, the server adds the client to the list of observers of the resource and includes the Max-Age option and the observe option for this resource. Then if the resource at the origin server changes, or the resource representation at the proxy is about to expire, then the server sends a notification to the proxy to update the cached resource representation, e.g., in notifications 5 and 6.

Table 5 shows example option extensions to CoAP that may be used to support context-awareness. The options in Table 5 are not exhaustive. It will be appreciated that equivalent options may be defined for all forms of context awareness. Furthermore, note that the options in Table 5 may be used individually, unless indicated to the contrary, or used in combination.

TABLE 5

CoAP Extension Options to Support Context-Aware Solutions

| CoAP Extension Options | Description | Meaning in a Request | Meaning in a Response |
| --- | --- | --- | --- |
| Observe-GroupNotification | Indicates if the CoAP endpoint supports (or is willing to receive) multicast observe notifications. Choices are: 1) Yes 2) No | Indicate if the endpoint that sends the Request supports multicast observe notifications | Not Applicable |
| TX-Count | The transmission count of a Confirmable message. A value of 1 indicates a first transmission, a value of 2 indicates a first retransmission of a message, a value of 3 indicates a second retransmission of a message | The transmission count of a confirmable message | The transmission count of a confirmable message |
| Proxy-Refresh-Type | The type of refresh that is being requested of the proxy Values: ValidationBased or ObserveBased | Signal to the proxy the refresh mechanism requested of the proxy | Not Applicable |
| Proxy-Freshness-Duration | How long the proxy should maintain the freshness | Signal to the proxy on how long it should maintain the cache fresh | Not Applicable |
| Observe-Freshness (See Note 1) | Indication to origin server to maintain the cache fresh through an Observe mechanism | Signal to the origin server to send notification to proxy to refresh its cache | Not Applicable |

Note 1:

The Observe-Freshness option may be a new option or a parameter addition to the existing Observe option In certain situations, the server may still wish to specify a Max-Age to the supplied resource. For example, the server may prefer to skip some notifications, e.g., due to connectivity or load issues. In such cases, the proxy may send an indication to the server that the proxy needs to always keep its cache fresh. This may be accomplished as a variation to the procedure described above in reference to FIG. 17. Referring again to FIG. 17, in this variation certain steps are modified as follows. Message 2 may specify observe=0, to Table 6 shows example configuration parameters that may be used to support context-aware extensions to CoAP. Again, the parameters shown in Table 6 are not exhaustive. It will be appreciated that equivalent parameters may be defined for all forms of context awareness. Furthermore, note that the parameters in Table 6 may be used individually, unless indicated to the contrary, or used in combination. These parameters may be pre-configured in the endpoints or retrieved through a management mechanism.

TABLE 6

CoAP Extension Configuration Parameters to support Context-Aware Solutions

| Parameter | Description |
| --- | --- |
| OBSERVE_MULTICAST_DELETE_THRESHOLD | Applies at Server<br>If the number of clients on list of observers for an eligible resource is below this threshold, delete the multicast notification group. |
| OBSERVE_MULTICAST_CREATE_THRESHOLD | Applies at Server<br>If the number of clients on list of observers for an eligible resource is above this threshold, create the multicast notification group. |
| observationWindowTimer | Applies at Client<br>Time during which an endpoint will wait for Acknowledgements for a Confirmable message transmission |
| TO_INCREASE_THRESHOLD | Applies at Client<br>Timeout Increase threshold.<br>Threshold above which an ACK count for a client-server link will trigger a timeout increase |
| TO_INCREASE_DELTA | Applies at Client<br>If timeout increase is triggered, denotes the amount of increase in timeout |
| TO_INCREASE_FACTOR | Applies at Client<br>If timeout increase is triggered, denotes the factor by which the timeout is increased |
| MAX_ACK_TIMOEUT | Applies at Client<br>Maximum timeout value after a timeout increase |
| TO_DECREASE_THRESHOLD | Applies at Client<br>Timeout Decrease threshold.<br>Threshold below which an ACK count for a client-server link will trigger a timeout decrease |
| TO_DECREASE_DELTA | Applies at Client<br>If timeout decrease is triggered, denotes the amount of decrease in timeout |
| TO_DECREASE_FACTOR | Applies at Client<br>If timeout decrease is triggered, denotes the factor by which the timeout is decreased |
| MIN_ACK_TIMEOUT | Applies at Client<br>Minimum timeout value after a timeout decrease |

Figure 18:
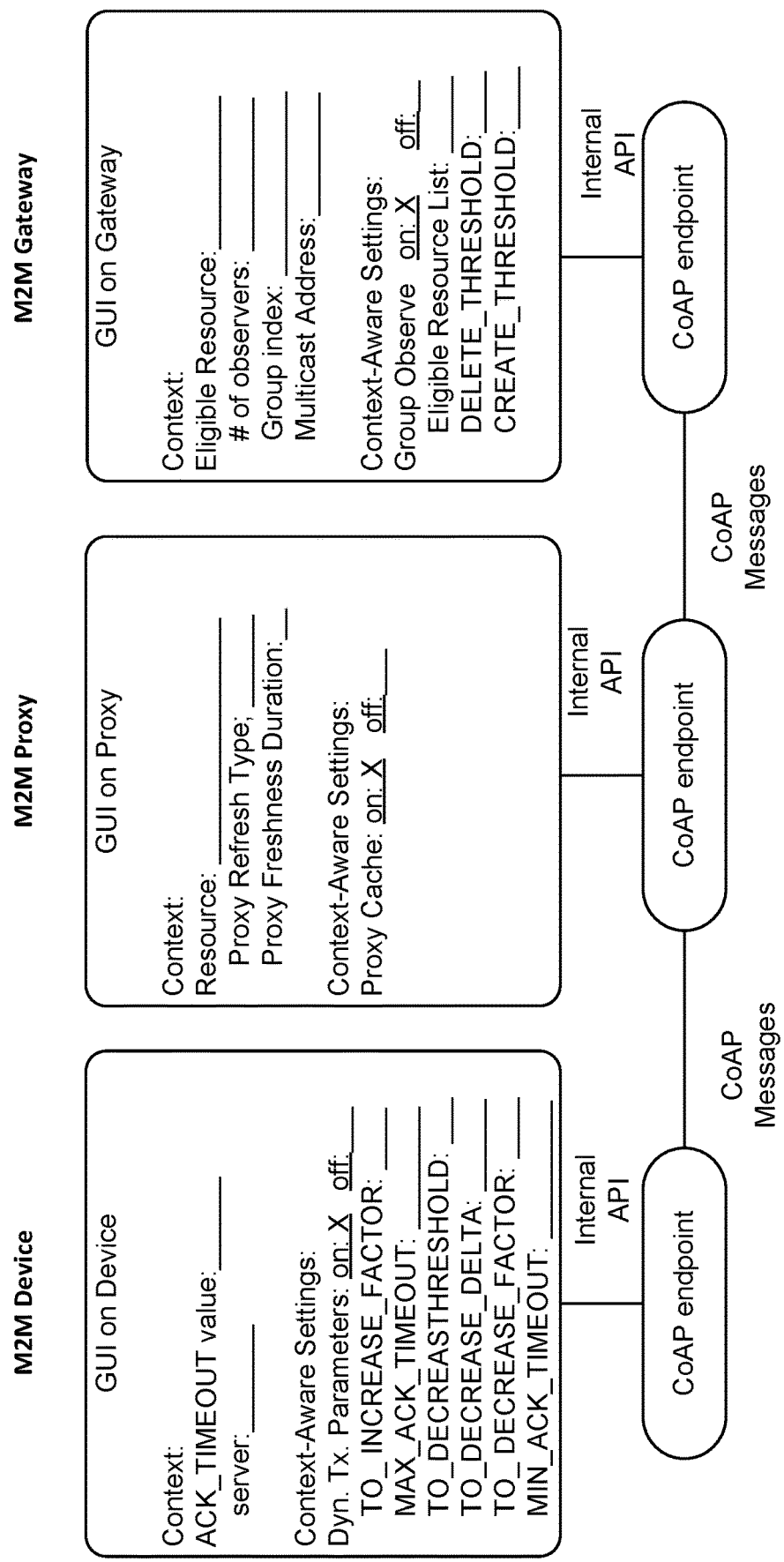
FIG. 18 is a system diagram of graphical user interfaces operating on an M2M device and an M2M gateway.

FIG. 18 shows examples of graphical user interfaces (GUIs) operating on an M2M/IoT/WoT device, proxy, and gateway. Any CoAP device, proxy, or gateway may support a GUI independently. For example, while the example of FIG. 18 shows GUIs operating on all three devices, a GUI may operate only on the device or gateway in a given network, regardless of whether a proxy is present or not. A user may use a GUI in a number of ways to view the context-aware settings and information described herein. For example, when CoAP endpoints on the device and gateway exchange CoAP messages, a sniffer may be used to see what messages are exchanged.

Alternatively, if there is a GUI interface on the device, proxy, or gateway, the GUI interface can be used to configure and display the parameters associated with the context-aware procedures of the endpoints. The GUI may use filters to select what information is displayed. Similarly, the GUI may be used to obtain CoAP operational information via an internal Application Programming Interface (API) to the software stack running the CoAP endpoint. Therefore the GUI interface would be able to show the context-aware CoAP operations. For example, the GUI may show that a multicast notification group has been created. Note that the GUI shows context and context aware settings particular to a node. It should be understood that this is only for illustration purposes, and both the context and the context-aware settings can be applied to any node. For instance, the transmission parameter context and setting shown in the device, are also applicable to the proxy and gateway device.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 19:
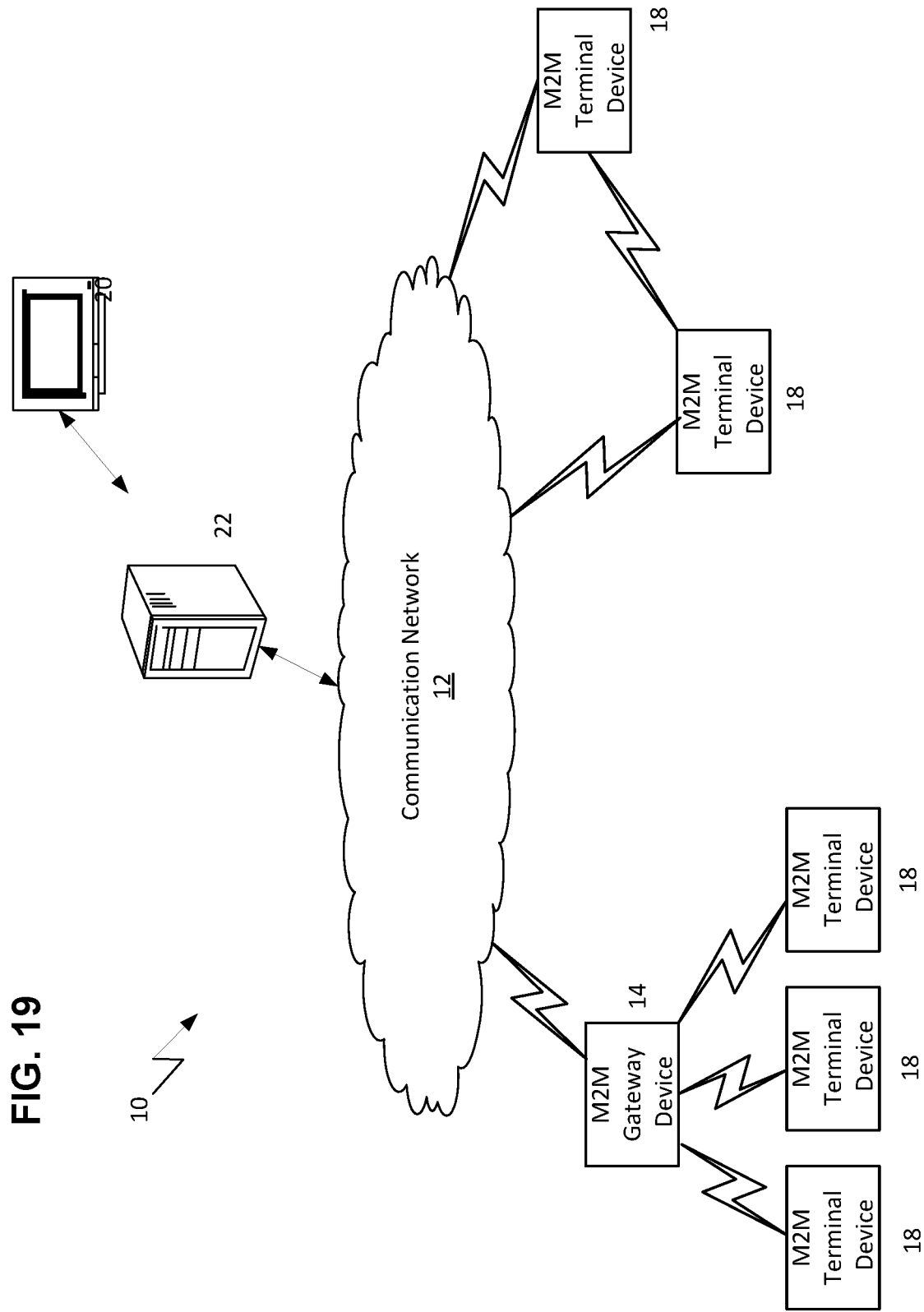
FIG. 19 is a system diagram of an example machine-to-machine (M2M), Internet of Things (IoT), or Web of Things (WoT) communication system in which one or more disclosed embodiments may be implemented.

As shown in FIG. 19, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Figure 20:
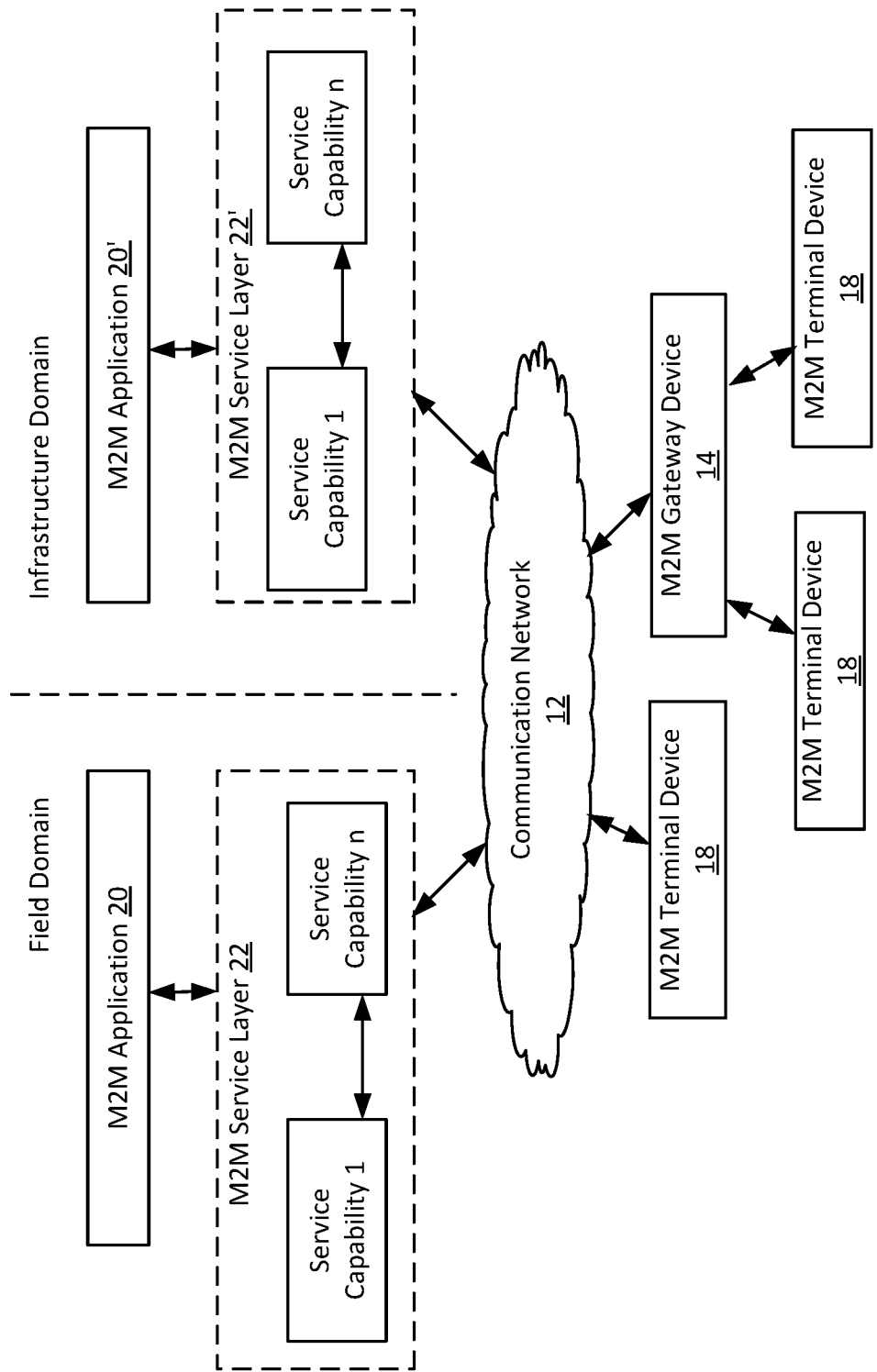
FIG. 20 is a system diagram of an example architecture that may be used within the M2M/IoT/WoT communications system illustrated in FIG. 19.

Referring to FIG. 20, the illustrated M2M service layer 22 in the field domain provides services for the M2M application 20, M2M gateways 14, and M2M devices 18 and the communication network 12. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprise servers, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12. M2M service layer 22' also provides services for the M2M gateways 14 and M2M devices 18 in the field domain.

It will be understood that the M2M service layer 22' may communicate with any number of M2M applications, M2M gateways and M2M devices. The M2M service layer 22' may interact with a service layer by a different service provider. The M2M service layer 22' may be implemented by one or more nodes of the network, which may comprise servers, computers, devices, virtual machines (e.g., cloud computing/storage farms, etc.) or the like.

Referring also to FIG. 20, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks, e.g. network 12, in connection with the services that the service layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a service layer, such as the service layers 22 and 22' illustrated in FIGS. 19 and 20, defines a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (e.g., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3 GPP) has also defined an architecture for machine-type communications (MTC). In that architecture, the service layer and the service capabilities it provides are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 21 or FIG. 22 described below.

Further, the methods and functionalities described herein may be implemented as part of an M2M network that uses a Service Oriented Architecture (SOA) and/or a Resource-Oriented Architecture (ROA) to access services.

Figure 21:
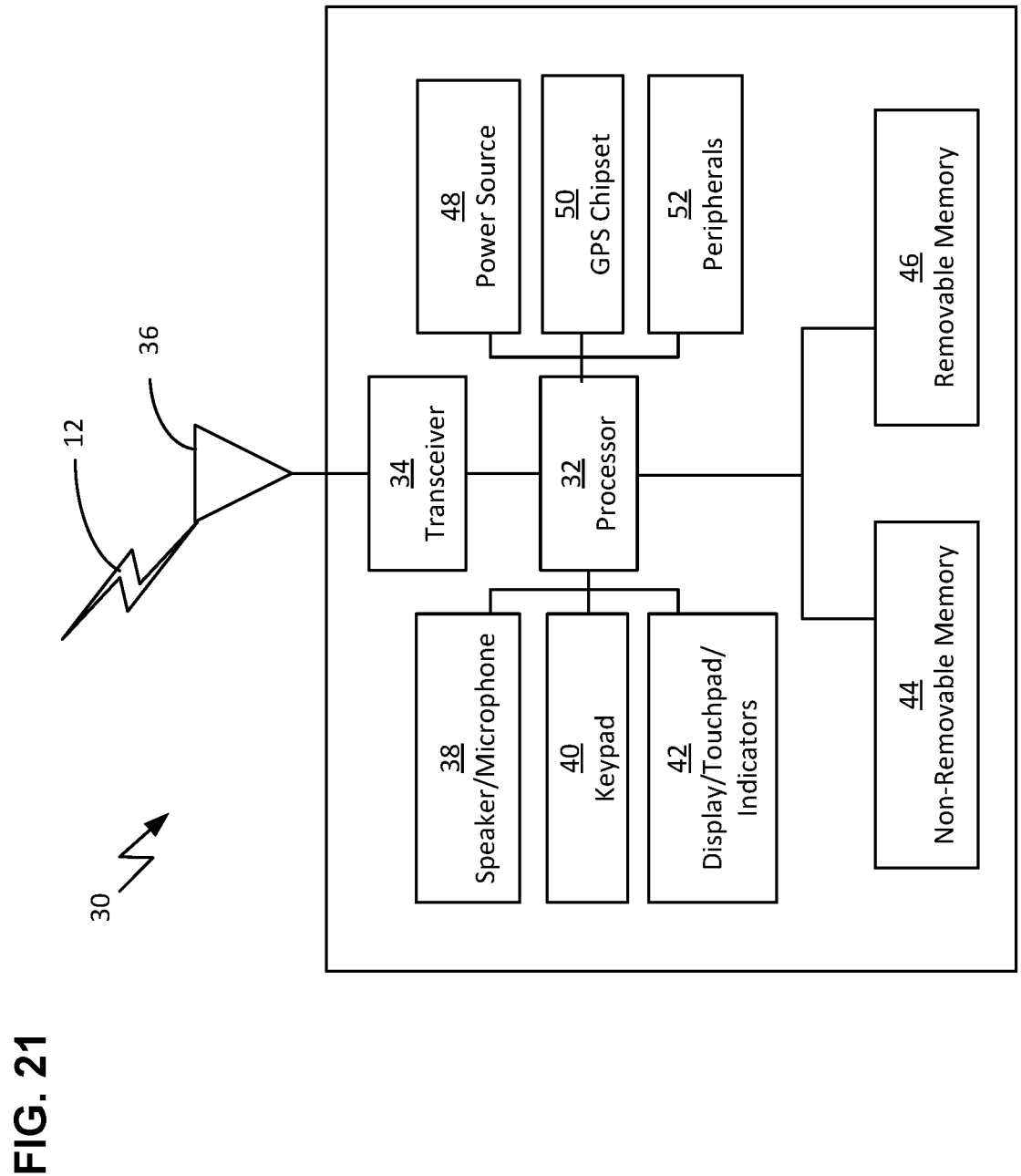
FIG. 21 is a system diagram of an example communication network node, such as an M2M/IoT/WoT node, gateway, or server that may be used within the communications system illustrated in FIGS. 19 and 20.

FIG. 21 is a block diagram of an example hardware/software architecture of a node of a network, such as one of the devices illustrated in FIG. 2-5, 7-12, 14, or 16-18 which may operate as an M2M server, gateway, device, or other node in an M2M network such as that illustrated in FIGS. 19 and 20. As shown in FIG. 21, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. It will be appreciated that the node 30 may include any sub-combination of the foregoing elements while remaining consistent with an embodiment. This node may be a node that implements aspects of the autonomous context-aware functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 21, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein, e.g., as described in reference to FIGS. 2, 5, 7, and 9-18 and in the claims. While FIG. 21 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of context-aware capabilities, settings and information, or to obtain input from a user or display information to a user about the node's context-aware settings, information, or capabilities.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

Figure 22:
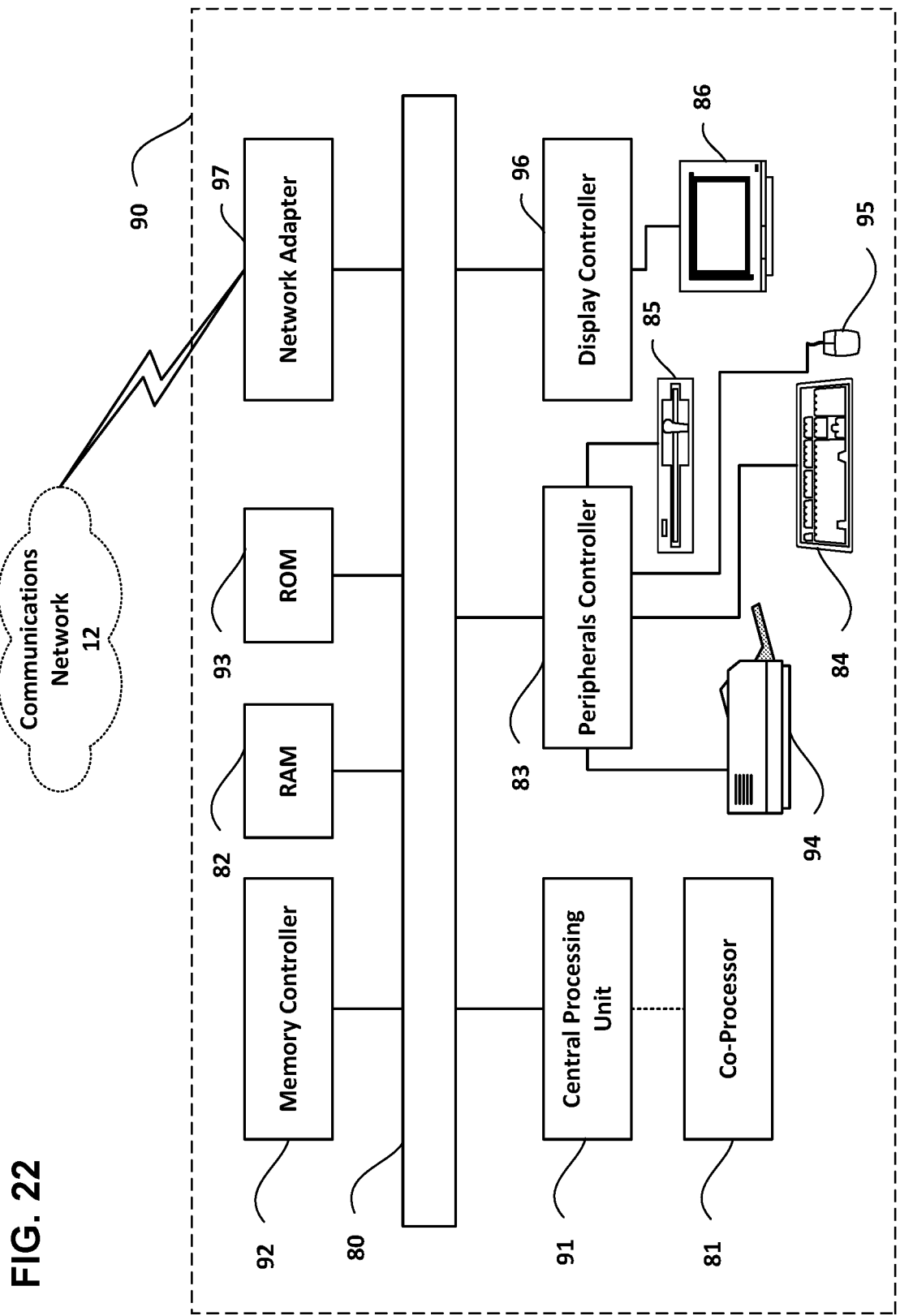
FIG. 22 is a block diagram of an example computing system in which a node of the communication system of FIGS. 19 and 20 may be embodied.

FIG. 22 is a block diagram of an exemplary computing system 90 which may also be used to implement one or more nodes of a network, such as the devices illustrated in FIG. 2-5, 7-12, 14, or 16-18, which may operate as an M2M server, gateway, device, or other node in an M2M network such as that illustrated in FIGS. 19 and 20. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as autonomous context aware procedures.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 19 and FIG. 20, to enable the computing system 90 to communicate with other nodes of the network. The communication circuitry, alone or in combination with the CPU 91, may be used to perform the transmitting and receiving steps described herein (e.g., in FIGS. 2-5, 7, and 9-18) and in the claims.

It is understood that any or all of the systems, methods, and processes described herein may be embodied in the form of computer executable instructions (e.g., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus comprising a processor, a memory, and communication circuitry, the apparatus being connected to a Constrained Application Protocol (CoAP) communications network via its communication circuitry, the apparatus further comprising computer-executable instructions stored in the memory which, when executed by the processor, cause the apparatus to perform operations comprising:
monitoring a dynamic context of operations, the dynamic context of operations comprising CoAP methods pertaining to CoAP observes of a CoAP resource;
performing, based on the monitoring, an evaluation, the evaluation using a metric comprising a number of endpoints observing the CoAP resource; and
adjusting, autonomously based on the evaluation, a multicast group configuration.

2. The apparatus of claim 1, wherein adjusting the multicast group configuration comprises creating a new multicast group based on the evaluation.

3. The apparatus of claim 1, wherein the evaluation comprises taking into account whether the number of endpoints observing the CoAP resource is above a threshold.

4. The apparatus of claim 1, wherein the evaluation comprises taking into account a preference of an endpoint for receiving multicast messaging.

5. The apparatus of claim 1, wherein:
the apparatus is a proxy;
the dynamic context comprises a first freshness preference, the first freshness preference pertaining to the CoAP resource, the first freshness preference being provided by a client;
the evaluation comprises assessing a freshness of the CoAP resource and the first freshness preference; and
the operations further comprise requesting to observe the CoAP resource on a server, and providing the server with a second freshness preference.

6. The apparatus of claim 1, wherein:
the apparatus is a proxy;
the dynamic context comprises a freshness preference, the first freshness preference pertaining to the CoAP resource, the first freshness preference being provided by a client;
the evaluation comprises assessing a freshness of the CoAP resource and the freshness preference; and
the operations further comprise periodically validating a representation of the CoAP resource through a server.

7. The apparatus of claim 1, wherein:
the dynamic context comprises a transmission timeout event or an ACK message, the transmission timeout event or the ACK message being related to a sent confirmable message;
the evaluation comprises assessing a return trip time, the return trip time being based upon a transmission time or the ACK message; and
the operations further comprise adjusting a transmission timeout period.

8. The apparatus of claim 1, wherein:
the dynamic context comprises a transmission timeout event or a number of ACK messages, the transmission timeout event or the ACK message being related to a sent confirmable message;
the evaluation comprises assessing a number of transmission timeouts or the number of ACK messages; and
the operations further comprise adjusting a transmission timeout period.

9. The apparatus of claim 1, wherein:
the dynamic context comprises an ACK message related to a sent confirmable message;
the evaluation comprises examining a transmission count option included in the ACK message; and
the operations further comprise adjusting a transmission timeout period.

10. The apparatus of claim 1, wherein the computer-executable instructions cause the apparatus to further provide a graphical user interface whereby a user may see and/or configure the monitoring, the evaluation, or the action taken.

11. A method performed by an apparatus forming a node of a CoAP communications network, the method comprising:
monitoring a dynamic context of operations, the dynamic context of operations comprising CoAP methods pertaining to CoAP observes of a CoAP resource;
performing, based on the monitoring, an evaluation, the evaluation using a metric comprising a number of endpoints observing the CoAP resource; and
adjusting, autonomously based on the evaluation, a multicast group configuration.

12. The method of claim 11, wherein adjusting the multicast group configuration comprises creating a new multicast group based on the evaluation.

13. The method of claim 11, wherein the evaluation comprises taking into account whether the number of endpoints observing the CoAP resource is above a threshold.

14. The method of claim 11, wherein the evaluation comprises taking into account a preference of an endpoint for receiving multicast messaging.

15. The method of claim 11, wherein:
the node is a proxy;
the dynamic context comprises a first freshness preference, the first freshness preference pertaining to the CoAP resource, the first freshness preference being provided by a client;
the evaluation comprises assessing a freshness of the CoAP resource and the first freshness preference; and
the operations further comprise requesting to observe the CoAP resource on a server, and providing the server with a second freshness preference.

16. The method of claim 11, wherein:
the apparatus is a proxy;
the dynamic context comprises a freshness preference for the CoAP resource, the freshness preference being provided by a client;
the evaluation comprises assessing a freshness of the CoAP resource and the freshness preference; and
the method further comprises periodically validating a representation of the CoAP resource through a server.

17. The method of claim 11, wherein:
the dynamic context comprises a transmission timeout event or an ACK message, the transmission timeout event or the ACK message being related to a sent confirmable message;
the evaluation comprises assessing a return trip time, the return trip time being based upon a transmission time or the ACK message; and
the method further comprises adjusting a transmission timeout period.

18. The method of claim 11, wherein:
the dynamic context comprises a transmission timeout event or a number of ACK messages, the transmission timeout event or the ACK message being related to a sent confirmable message;

the evaluation comprises assessing a number of transmission timeouts or the number of ACK messages; and the method further comprises adjusting a transmission timeout period.

19. The method of claim 11, wherein:

the dynamic context comprises an ACK message related to a sent confirmable message;

the evaluation comprises examining a transmission count option included in the ACK message; and the method further comprises adjusting a transmission timeout period.

20. The method of claim 11, further comprising providing a graphical user interface whereby a user may see and/or configure the monitoring, the evaluation, or the action taken.

* * * * *